(12) United States Patent
Jin et al.

(10) Patent No.: US 12,657,298 B2
(45) Date of Patent: Jun. 16, 2026

(54) AUTOMATIC BINARY CODE UNDERSTANDING

(71) Applicant: Microsoft Technology Licensing, LLC, Redmond, WA (US)

(72) Inventors: Xin Jin, Columbus, OH (US); Weiwei Yang, Seattle, WA (US); Jonathan Karl Larson, Bremerton, WA (US); Michael T. Walker, Snoqualmie, WA (US); Dustin Richard Fraze, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 18/377,710

(22) Filed: Oct. 6, 2023

(65) Prior Publication Data

US 2025/0117479 A1     Apr. 10, 2025

(51) Int. Cl.
| | |
|---|---|
| *G06F 21/56* | (2013.01) |
| *G06F 40/00* | (2020.01) |
| *G06F 8/73* | (2018.01) |
| *G06F 8/74* | (2018.01) |
| *G06F 8/75* | (2018.01) |
| *G06F 21/57* | (2013.01) |
| *G06F 40/30* | (2020.01) |
| *G06N 3/08* | (2023.01) |
| *G06N 20/00* | (2019.01) |

(52) U.S. Cl.
CPC .............. *G06F 21/563* (2013.01); *G06F 8/73* (2013.01); *G06F 8/74* (2013.01); *G06F 8/75* (2013.01); *G06F 21/562* (2013.01); *G06F* 21/577 (2013.01); *G06F 40/00* (2020.01); *G06F 40/30* (2020.01); *G06N 3/08* (2013.01); *G06N 20/00* (2019.01)

(58) Field of Classification Search
CPC ..... G06F 8/73; G06F 8/74; G06F 8/75; G06F 21/562; G06F 21/563; G06F 21/577; G06F 40/00; G06N 20/00
See application file for complete search history.

(56) References Cited

U.S. PATENT DOCUMENTS

| | | | | |
|---|---|---|---|---|
| 10,762,206 | B2 * | 9/2020 | Titonis ................ | H04W 12/128 |
| 11,516,158 | B1 * | 11/2022 | Luzhnica ................ | G06F 40/35 |

(Continued)

OTHER PUBLICATIONS

Xiong Jiaqi et al "HexT5: Unified Pre-Training for Stripped Binary Code Information Inference" Sep. 11, 2023 2023 38th IEEE/ACM International Conference on Automated Software Engineering, IEEE p. 774-798 https://ieeexplore.ieee.org/stamp/stamp.jsp?tp=&arnumber= 10298504&tag=1 (Year: 2023).*

(Continued)

*Primary Examiner* — Randy A Scott
(74) *Attorney, Agent, or Firm* — Rainier Patents, P.S.

(57) ABSTRACT

The description relates to automated binary code summarization. In one example, a binary code summarization tool receives binary code and combines the received binary code with natural language in a prompt for a large language model (LLM). The binary code summarization tool receives a semantic summarization from the LLM relating to the received binary code and evaluates the new semantic summarization for malicious functionality in the received binary code.

20 Claims, 26 Drawing Sheets

(56)            References Cited

U.S. PATENT DOCUMENTS

2023/0297688 A1* 9/2023 Boulton .............. H04L 63/1458
                                                    726/25
2024/0311642 A1* 9/2024 Choi ...................... G06N 3/094
2025/0111051 A1* 4/2025 Mantin ................... G06F 21/54

OTHER PUBLICATIONS

"Improving Search Ranking with Few-Shot Prompting of LLMs"—
Jo Kristian Bergum, Vespa, Feb. 3, 2023 https://blog.vespa.ai/
improving-text-ranking-with-few-shot-prompting/ (Year: 2023).*
"MoleculeGPT: Instruction Following Large Language Models for
Molecular Property Prediction"—Zhang et al., The NeurIPS 2023
New Frontiers of AI for Drug Discovery and Development, Aug.
2023 https://ai4d3.github.io/2023/papers/34.pdf (Year: 2023).*
Al-Kaswan, et al., "Extending Source Code Pre-Trained Language
Models to Summarise Decompiled Binaries", arXiv:2301.01701v1,
Jan. 4, 2023,13 Pages.
International Search Report and Written Opinion received for PCT
Application No. PCT/US2024/047347, mailed on Feb. 25, 2025, 17
pages.
Xiong, et al., "HexT5: Unified Pre-Training for Stripped Binary
Code Information Inference", 2023 38th IEEE/ACM International
Conference on Automated Software Engineering (ASE), Sep. 2023,
pp. 774-786.
Zhang, et al., "Pre-Training Representations of Binary Code Using
Contrastive Learning", arXiv:2210.05102v2, Aug. 30, 2023, 12
Pages.
"GNU Software", Retrieved from: https://www.gnu.org/software/,
Dec. 27, 2021, 5 Pages.
"Where to document functions in C or C++?", Retrieved from:
https://stackoverflow.com/questions/3568052/where-to-document-
functions-in-c-or-c, Nov. 21, 2019, 5 Pages.
Ahmed, et al., "Learning to find usages of library functions in
optimized binaries", In Journal of IEEE Transactions on Software
Engineering, vol. 48, Issue: 10, Oct. 1, 2022, pp. 3862-3876.
Al-Kaswan, et al., "Extending Source Code Pre-Trained Language
Models to Summarise Decompiled Binarie", In Proceedings of
IEEE International Conference on Software Analysis, Evolution and
Reengineering (SANER), Mar. 21, 2023, pp. 260-271.
Brown, et al., "Language Models are Few-Shot Learners", In
Journal of Advances in neural information processing systems, vol.
33, Dec. 6, 2020, 25 Pages.
Chen, et al., "Why my code summarization model does not work:
Code comment improvement with category prediction", In Journal
of ACM Transactions on Software Engineering and Methodology,
vol. 30, No. 2, Feb. 2021, 29 Pages.
Choo, Bao Hua, "The emergence of Large Language Models
(LLMs)", Retrieved from: https://thelowdown.momentum.asia/the-
emergence-of-large-language-models-llms/, Mar. 23, 2023, 4 Pages.
Gao, et al., "A lightweight framework for function name reassign-
ment based on large-scale stripped binaries", In Proceedings of the
30th ACM SIGSOFT International Symposium on Software, Jul.
11, 2021, pp. 607-619.
Goodin, Dan, "Hackers exploit gaping Windows loophole to give
their malware kernel access", Retrieved from: https://arstechnica.
com/security/2023/07/hackers-exploit-gaping-windows-loophole-to-
give-their-malware-kernel-access/, Jul. 12, 2023, 6 Pages.
He, et al., "Debin: Predicting Debug Information in Stripped
Binaries", In Proceedings of the ACM SIGSAC Conference on
Computer and Communications Security, Oct. 15, 2018, pp. 1667-
1680.
Jin, et al., "Symlm: Predicting function names in stripped binaries
via context-sensitive execution-aware code embeddings", In Pro-
ceedings of the 2022 ACM SIGSAC Conference on Computer and
Communications Security, Nov. 7, 2022, pp. 1631-1645.
Reimers, et al., "Sentence-BERT: Sentence Embeddings using
Siamese BERT-Networks", In Repository of arXiv:1908.10084v1,
Aug. 27, 2019, 11 Pages.

Song, et al., "Mpnet: Masked and permuted pre-training for lan-
guage understanding", In Proceedings of 34th Conference on Neu-
ral Information Processing Systems, Dec. 6, 2020, pp. 1-11.
Sun, et al., "Automatic Code Summarization via ChatGPT: How Far
Are We?", In Repository of arXiv:2305.12865v1, May 22, 2023, 13
Pages.
Wei, et al., "Emergent Abilities of Large Language Models", In
repository of arXiv:2206.07682v1, Jun. 15, 2022, 16 Pages.
Zurier, Steve, "Malicious Microsoft Office docs drop LokiBot
malware", Retrieved from: https://www.scmagazine.com/news/
malicious-microsoft-office-docs-drop-lokibot-malware, Jul. 13, 2023,
6 Pages.
OpenAI, "Gpt-4 technical report", In Repository of arXiv.2303.
08774v1, Mar. 15, 2023, 99 pages.
"angr Decompiler". Retrieved from: https://docs.angr.io/en/v9.2.68/
analyses/decompiler.html, 2023, 3 Pages.
"Capstone—the ultimate disassembler", Retrieved from: https://
www.caps gine.org/, 2023, 9 Pages.
"Chroma is the open-source search and retrieval database for AI
applications", Retrieved from: https://www.trychroma.com/, 2023,
10 Pages.
"Code Llama", Retrieved from: https://huggingface.co/codellama,
2023, 4 Pages.
"Common Crawl Dataset", Retrieved from: https://registry.opendata.
aws/commoncrawl/, 2023, 3 Pages.
"ghidra", Retrieved from: https://github.com/NationalSecurityAgency/
ghidra, 2023, 6 Pages.
"Introducing Virus Total Code Insight: Empowering threat analysis
with generative AI", Retrieved from. https://blog.virustotal.com/
2023/04/introducing-virustotal-code-insight.html, Apr. 24, 2023, 8
Pages.
"Meta Llama", Retrieved from: https://huggingface.co/meta-llarna,
2023, 6 Pages.
"Microsoft Security Copilot", Retrieved from: https://www.microsoft.
com/en-us/security/business/ai-machine-learning/microsoft-security-
copilot, 2023, 10 Pages.
"Module ida_hexrays", Retrieved from internet: https://web.archive.
org/web/20221130134059/https://www.hex-rays.com/products/ida/
support/idapython_docs/ida_hexrays.html, Nov. 30, 2022, 436 Pages.
"Module ida_idaapi", Retrieved from internet: https://web.archive.
org/web/20221219104418/https://www.hexrays.com/products/ida/
support/idapython_docs/ida_idaapi.html, Dec. 19, 2022, 14 Pages.
"Open LLM Leaderboard Archived", Retrieved from: https://
huggingface.co/spaces/open-llm-leaderboard/open_llm_leader-
board#/, 2023, 1 Page.
"Openai—Rate limits", Retrieved from: https://platform.openai.com/
docs/guides/rate-limits/overview, 2023, 6 Pages.
"Openai api reference—create chat completion", Retrieved from:
https://platform.openai.com/docs/api-reference/chat/create, 2025, 7
Pages.
"Package ghidra.app.decompiler", Retrieved from: https://ghidra.
re/ghidra_docs/api/ghidra/app/decompiler/package-summary.html, 2023,
3 Pages.
"pyelftools—Parsing ELF and DWARF in python", Retrieved from:
https://github.com/eliben/pyelftools, 2023, 3 Pages.
"Sentence-transformers—pretrained models", Retrieved from inter-
net: https://www.sbert net/docs/pretrained_models.html# pretrained-
models, 2023. 5 Pages.
"VT Code Insight: Updates and Q&A on Purpose, Challenges, and
Evolution", Retrieved from: https://blog.virustotal.com/2023/05/vt-
code-insight-updates-and-q-on.html, May 12, 2023, 9 Pages.
Baldoni, et al., "A survey of symbolic execution techniques", ACM
Computing Surveys, vol. 51, No. 03, May 23, 2018, 39 Pages.
Banerjee, et al., "Variable Name Recovery in Decompiled Binary
Code using Constrained Masked Language Modeling", Retrieved
from: https://arxiv org/abs/2103.12801, Mar. 23, 2021, 10 Pages.
Banerjee, et al., "METEOR: An Automatic Metric for MT Evalu-
ation with Improved Correlation with Human Judgments," in Pro-
ceedings of the ACL Workshop on Intrinsic and Extrinsic Evalua-
tion Measures for Machine Translation and/or Summarization, Jun.
2005, pp. 65-72.

(56)                    References Cited

OTHER PUBLICATIONS

Chen, et al., "Augmenting Decompiler Output with Learned Variable Names and Types", 31st USENIX Security Symposium, 2022, pp. 4327-4343.

Collard, et al., "srcML; An Infrastructure for the Exploration, Analysis, and Manipulation of Source Code: A Tool Demonstration", IEEE International Conference on Software Maintenance, 2013, pp. 616-519.

Darpa: "CGC: Cyber Grand Challenge", Retrieved from: https://www.darpa.mil/research/programs/cyber-grand-challenge, 2025, 5 Pages.

David, et al., "Neural reverse engineering of stripped binaries using augmented control flow graphs", Proceedings of the ACM on Programming Languages, vol. 04, Nov. 13, 2020, 28 Pages.

Deng, et al., "Model Compression and Hardware Acceleration for Neural Networks: A Comprehensive Survey". Proceedings of the IEEE, vol. 108, No. 04, Apr. 2020, 48 Pages.

Feng, et al., "CodeBERT: A Pre-Trained Model for Programming and Natural Languages", arXiv:2002.08155v4, Sep. 18, 2020, 12 Pages.

Ganti, et al., "Introducing AI-powered insights in Threat Intelligence", Retrieved from: https://cloud.google.com/blog/products/identity-security/rsa-introducing-ai-powered-insights-threat-intelligence, Apr. 25, 2023, 10 Pages.

Gao, et al., "VulSeeker: a semantic learning-based vulnerability seeker for cross-platform binary", Proceedings of the 33rd ACM/IEEE International Conference on Automated Software Engineering, Sep. 3, 2018, pp. 896-899.

Guo, et al., "GraphCodeBERT: Pre-training Code Representations with Data Flow", In Repository of arXiv:2009.08366v2, Sep. 29, 2020, pp. 1-14.

Hao, et al., "SyzDescribe: Principled, Automated, Static Generation of Syscall Descriptions for Kernel Drivers", IEEE Symposium on Security and Privacy, 2023, 17 Pages.

Huang, et al., "Large Language Models Can Self-Improve", Retrieved from: https://arxiv.org/abs/2210.11610, Oct. 25, 2022, 19 Pages.

Hughes, Alex, "ChatGPT: Everything you need to know about OpenAI's GPT-4 tool", Retrieved from: https://www.sciencefocus.com/future-technology/gpt-3, Sep. 25, 2023, 21 Pages.

Husain, et al., "CodeSearchNet Challenge: Evaluating the State of Semantic Code Search", https://arxiv.org/abs/1909.09436v2, Sep. 27, 2019, 6 Pages.

Iyer, et al., "Summarizing Source Code using a Neural Attention Model", In Proceedings of the 54th Annual Meeting of the Association for Computational Linguistics, vol. 1: Long Papers, Aug. 7, 2016, pp. 2073-2083.

Jin, et al., "Binary Code Summarization: Benchmarking ChatGPT/GPT-4 and Other Large Language Models", arXiv:2312.09601, Dec. 15, 2023, 22 pages.

Kocetkov, et al., "The Stack: 3 TB of permissively licensed source code", https://arxiv.org/abs/2211.15533, Nov. 20, 2022, 27 Pages.

Kudo, et al., "SentencePiece: A simple and language independent subword tokenizer and detokenizer for Neural Text Processing", Arxiv Cornell University, Aug. 19, 2018, 6 pages.

Li, et al., "Guiding Large Language Models via Directional Stimulus Prompting", In Repository of arXiv:2302.11520v1, Feb. 22, 2023, 20 Pages.

Li, et al., "PalmTree: Learning an Assembly Language Model for Instruction Embedding", Proceedings of the 2021 ACM SIGSAC Conference on Computer and Communications Security, Nov. 13, 2021, pp. 3236-3251.

Lin, et al., "ROUGE: A Package for Automatic Evaluation of Summaries", In Text Summarization Branches Out, Jul. 2004, 8 Pages.

Liu, et al., "Pre-train, Prompt, and Predict: A Systematic Survey of Prompting Methods in Natural Language Processing", ACM Computing Surveys, vol. 56, No. 9, 2023, pp. 1-36.

Luo, et al., "VulHawk: Cross-architecture Vulnerability Detection with Entropy-based Binary Code Search", In NDSS, 2023, 18 Pages.

Mantovani, et al., "RE-Mind: a First Look inside the Mind of a Reverse Engineer", 31st USENIX Security Symposium, 2022, 19 Pages.

Min, et al., "Recent advances in natural language processing via large pre-trained language models: A survey", In Repository of Arxiv: 2111.01243V1, Nov. 1, 2021, 49 pages.

Minaee, et al., "Deep learning-based text classification: a comprehensive review", ACM computing surveys (CSUR), vol. 54, Issue No. 3, Jan. 4, 2021, 43 pages.

Or-Meir, et al., "Dynamic malware analysis in the modern era—A state of the art survey", ACM Computing Surveys (CSUR), vol. 52, Issue No. 5, 2019, 48 pages.

Pan, et al., "Automated generation of security-centric descriptions for smart contract bytecode", In Proceedings of the 32nd ACM SIGSOFT International Symposium on Software Testing and Analysis, 2023, 13 pages.

Papineni, et al., "Bleu: a Method for Automatic Evaluation of Machine Translation", In the Proceedings of the 40th Annual Meeting of the Association for Computational Linguistics, Jul. 2002, 8 Pages.

Parr Terence., "The definitive ANTLR 4 reference", The Pragmatic Bookshelf, 2013, 322 Pages.

Paszke, et al., "PyTorch: An Imperative Style, High-Performance Deep Learning Library", In 33rd Conference on Neural information Processing Systems, Dec. 3, 2019, 12 pages.

Patrick-Evans, et al., "XFL: Naming functions in binaries with extreme multi-label learning", In 2023 IEEE Symposium on Security and Privacy (SP), 2023, pp. 2375-2390.

Pedregosa, et al., "Scikit-Learn: Machine Learning in Python", In Journal of Machine Learning Research, vol. 12, Nov. 1, 2011, pp. 2825-2830.

Pei, et al., "Neudep: neural binary memory dependence analysis", In Proceedings of the 30th ACM Joint European Software Engineering Conference and Symposium on the Foundations of Software Engineering, 2022, 13 pages.

Pei, et al., "Trex: Learning execution semantics from micro-traces for binary similarity", arXiv preprint arXiv:2012.08680, 2020, 19 pages.

Pei, et al., "Xda: Accurate, robust disassembly with transfer learning", arXiv preprint arXiv:2010.00770, Nov. 19, 2020, 18 pages.

Pie, et al., "Stateformer: Fine-grained type recovery from binaries using generative state modeling", In Proceedings of the 29th ACM Joint Meeting on European Software Engineering Conference and Symposium on the Foundations of Software Engineering, 2021, pp. 690-702.

Pryzant, et al., "Automatic Prompt Optimization with"Gradient Descent" and Beam Search", In Repository of arXiv:2305.03495v2, Oct. 19, 2023, 12 Pages.

Rasley, et al., "Deepspeed: System optimizations enable training deep learning models with over 100 billion parameters", In Proceedings of the 26th ACM SIGKDD International Conference on Knowledge Discovery & Data Mining, Aug. 23, 2020, pp. 3505-3506.

Roziere, et al., "Code Llama: Open Foundation Models for Code", arXiv:2308.12950, 2023, 47 pages.

Shi, et al., "On the evaluation of neural code summarization", In Proceedings of the 44th international conference on software engineering, Feb. 11, 2022, 12 pages.

Shoshitaishivili, et al., "SOK: (State of) The Art of War: Offensive Techniques in Binary Analysis", IEEE Symposium on Security and Privacy, 2016, pp. 138-157.

Stern, Jacob, "GPT-4 Might Just Be a Bloated, Pointless Mess", Retrieved from: https://www.theatlantic.com/technology/archive/2023/03/openai-gpt-4-parameters-power-debate/73290/, Mar. 6, 2023, 8 Pages.

Tian, et al., "Is ChatGPT the Ultimate Programming Assistant—How far is it?", Retrieved from. https:/arxiv.org/abs/2304.11938, Aug. 31, 2023, 22 Pages,.

Touvron, et al., "Llama 2: Open Foundation and Fine-Tuned Chat Models", In repository of arXiv:2307.09288v1. Jul. 18, 2023, 76 Pages.

(56)          References Cited

OTHER PUBLICATIONS

Virtanen, et al., "SciPy 1.0: Fundamental Algorithms for Scientific Computing in Python", In Journal of Nature Methods, vol. 17, Issue 3, Mar. 2020, pp. 261-272.

Votipka, et al., "An observational investigation of reverse{Engineers'} processes", In 29th USENIX Security Symposium, 2020, pp. 1875-1892.

Wang, et al., "CodeT5: Identifier-aware Unified Pre-trained Encoder-Decoder Models for Code Understanding and Generation", Retrieved from: https://arxiv.org/abs/2109.00859, Sep. 2, 2021, 13 Pages.

Wang, et al., "Jtrans: Jump-aware transformer for binary code similarity detection", In Proceedings of the 31st ACM SIGSOFT International Symposium on Software Testing and Analysis, 2022, 13 Pages.

Wei, et al., "Chain-of-thought Prompting Elicits Reasoning in Large Language Models", In 36th Conference on Neural information Processing System, 2022, 14 Pages.

Wolf, et al., "Huggingface's Transfo ate Of-The-Art Natural Language Processing", arXiv: 1910.03771, Oct. 16, 2019, 11 pages.

Yakdan, et al., "Helping Johnny to Analyze Malware: A Usability-Optimized Decompiler and Malware Analysis User Study", IEEE Symposium on Security and Privacy, 2016, pp. 158-177.

Yang, et al., "Exploring the Limits of ChatGPT for Query or Aspect-based Text Summarization", Retrieved from: https://arxiv.org/abs/2302 08081, Feb. 16, 2023, 9 Pages.

Yang, et al., "Large Language Models as Optimizers", Retrieved from: https://arxiv.org/abs/2309 03409, Sep. 7, 2023, 40 Pages.

Yu, et al., "CodeCMR: Cross-Modal Retrieval for Function-Level Binary Source Code Matching", Advances in Neural Information Processing Systems vol. 33, 2020, 12 Pages.

Yu, et al., "Order Matters: Semantic-Aware Neural Networks for Binary Code Similarity Detection", Proceedings of the AAAI Conference on Artificial Intelligence, vol. 34, Apr. 3, 2020, pp. 1145-1152.

Zhou, et L., "Large Language Models Are Human-Level Prompt Engineers", Retrieved from: https://arxiv.org/abs/2211.01910v1, Nov. 3, 2022, 40 Pages.

International Preliminary Report on Patentability (Chapter I) received for PCT Application No. PCT/US2024/047347 mailed on Date Apr. 16, 2026, 11 Pages.

* cited by examiner

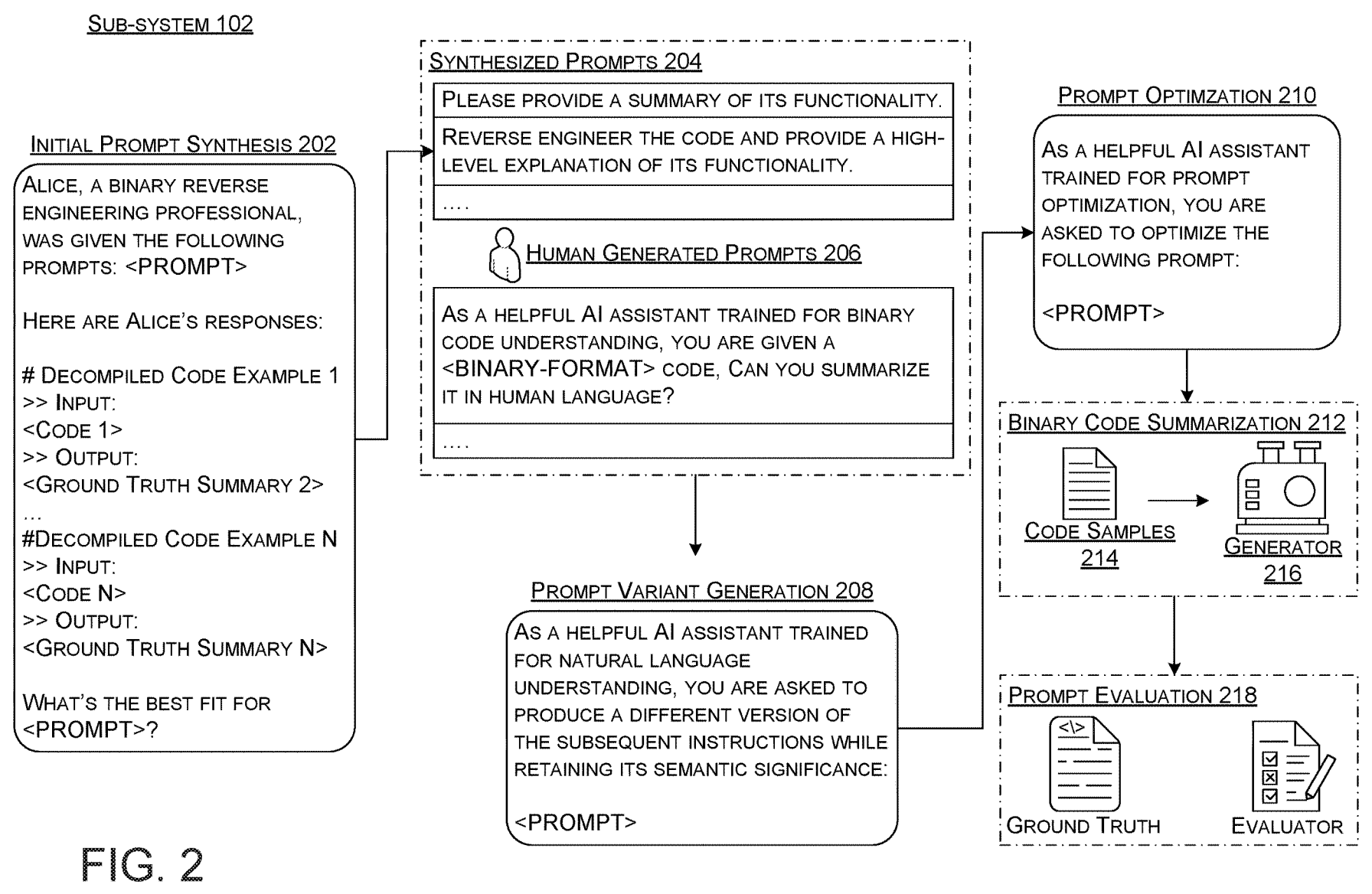

SUB-SYSTEM 102

PROMPT OPTIMIZATION 210

AS A HELPFUL AI ASSISTANT TRAINED FOR PROMPT OPTIMIZATION, YOU ARE ASKED TO OPTIMIZE THE FOLLOWING PROMPT:

<PROMPT>

BINARY CODE SUMMARIZATION 212

CODE SAMPLES 214

GENERATOR 216

PROMPT EVALUATION 218

EVALUATOR

GROUND TRUTH

SYNTHESIZED PROMPTS 204

PLEASE PROVIDE A SUMMARY OF ITS FUNCTIONALITY.

REVERSE ENGINEER THE CODE AND PROVIDE A HIGH-LEVEL EXPLANATION OF ITS FUNCTIONALITY.

....

HUMAN GENERATED PROMPTS 206

AS A HELPFUL AI ASSISTANT TRAINED FOR BINARY CODE UNDERSTANDING, YOU ARE GIVEN A <BINARY-FORMAT> CODE, CAN YOU SUMMARIZE IT IN HUMAN LANGUAGE?

....

PROMPT VARIANT GENERATION 208

AS A HELPFUL AI ASSISTANT TRAINED FOR NATURAL LANGUAGE UNDERSTANDING, YOU ARE ASKED TO PRODUCE A DIFFERENT VERSION OF THE SUBSEQUENT INSTRUCTIONS WHILE RETAINING ITS SEMANTIC SIGNIFICANCE:

<PROMPT>

INITIAL PROMPT SYNTHESIS 202

ALICE, A BINARY REVERSE ENGINEERING PROFESSIONAL, WAS GIVEN THE FOLLOWING PROMPTS: <PROMPT>

HERE ARE ALICE'S RESPONSES:

DECOMPILED CODE EXAMPLE 1
>> INPUT:
<CODE 1>
>> OUTPUT:
<GROUND TRUTH SUMMARY 2>

...
DECOMPILED CODE EXAMPLE N
>> INPUT:
<CODE N>
>> OUTPUT:
<GROUND TRUTH SUMMARY N>

WHAT'S THE BEST FIT FOR <PROMPT>?

FIG. 2

SUB-SYSTEM 104

FIG. 3B

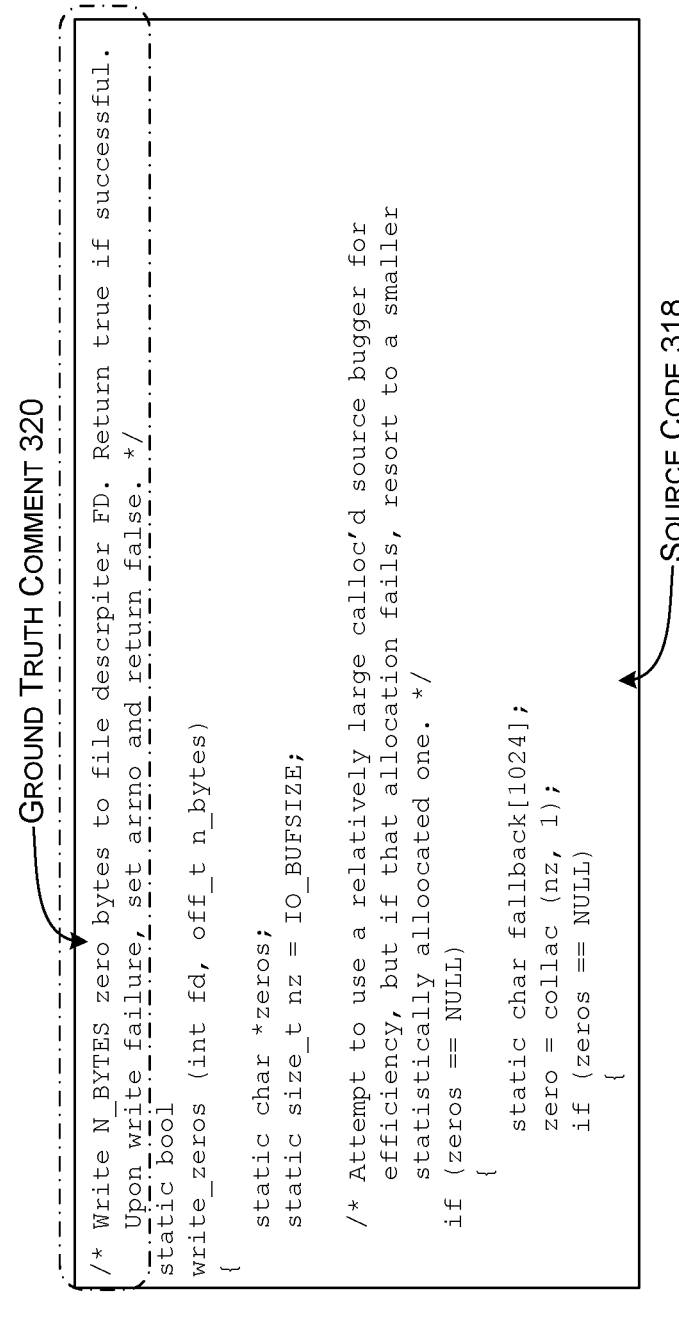

GROUND TRUTH COMMENT 320

```
/* Write N_BYTES zero bytes to file descrpiter FD. Return true if successful.
   Upon write failure, set arrno and return false. */
static bool
write_zeros (int fd, off_t n_bytes)
{
    static char *zeros;
    static size_t nz = IO_BUFSIZE;

/* Attempt to use a relatively large calloc'd source bugger for
       efficiency, but if that allocation fails, resort to a smaller
       statistically alloocated one. */
    if (zeros == NULL)
    {
        static char fallback[1024];
        zero = collac (nz, 1);
        if (zeros == NULL)
        {
```

SOURCE CODE 318

SUB-SYSTEM 104

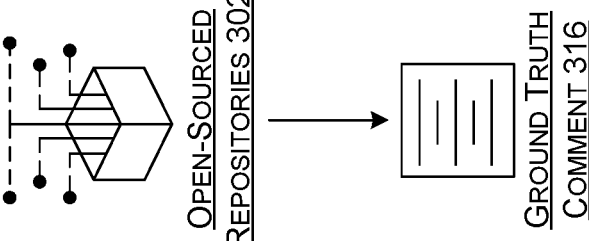

OPEN-SOURCED
REPOSITORIES 302

GROUND TRUTH
COMMENT 316

SUB-SYSTEM 104

GROUND TRUTH COMMENT 320

| FUNCTION | COMMENTS |
|----------|----------|
| FOO | GENERATE FOO NUMBERS |
| SORT | SORT INPUT ARR BY ASCENDING ORDER |

MISMATCH 324

BIN 10110 01001

STRIPPED BINARIES 314

0E 00 55 8B EC 83 EC 04 56 57 1E B8 94 00 50 9A
9A 07 00 3C 17 59 16 8D 46 FC 50 1E B8 B1 00 50
00 50 00 F0 19 83 C4 08 BE 01 00 EB 3B 1E B8 B4
C3 00 9A 0E 00 3C 17 59 59 16 8D 46 FE 50 1E B8
00 3B 50 9A 07 00 F0 17 83 C4 08 FF 76 FE 9A 7C
0E 00 16 59 8B F8 57 FF 76 FE 1E B8 C6 00 50 9A
9A 0A 3C 17 83 C4 08 46 3B 76 FC 7E C0 33 C0 50
8B 76 00 49 16 59 5F 5E 8B 8B E5 5D CB 55 8B EC
59 50 06 83 FE 02 7E 1E 8B C6 48 50 0E E8 EC FF
03 C2 8B C6 05 FE FF 50 0E E8 E0 FF 59 8B D0 58
   EB 07 EB 05 B8 01 00 EB 00 5E 5D CB

SUB-SYSTEM 104

GROUND TRUTH COMMENT 320

| FUNCTION | COMMENTS | START ADDRESS | END ADDRESS |
|----------|----------|---------------|-------------|
| FOO | GENERATE FOO NUMBERS | 0X14789 | 0X14852 |

```
0E 00 3C 17 59 83 EC 04 56 57 1E B8 94 00 50 9A
9A 07 00 F0 19 83 C4 08 BE 01 00 EB 3B 1E B8 B1 00 50
00 50 9A 0E 00 3C 17 59 59 16 8D 46 FE 50 1E B8 B4
C3 00 50 9A 07 00 F0 17 83 C4 08 FF 76 FE 9A 7C
00 3B 16 59 8B F8 57 FF FE 1E B8 C6 00 50 9A
0E 00 3C 17 83 C4 08 46 3B 76 FC 7E C0 33 C0 50
9A 0A 00 49 16 59 5F 5E 8B E5 5D CB 55 8B EC 56
8B 76 06 83 FE 02 7E 1E 8B C6 48 50 0E E8 EC FF
59 50 8B C6 05 FE FF 50 0E E8 E0 FF 59 8B D0 58
03 C2 EB 07 EB 05 B8 01 00 EB 00 5E 5D CB
```

STRIPPED BINARIES 314
BIN 10110 01001

START ADDRESS

END ADDRESS

FIG. 3E

BINARIES W/ DEBUGGING INFO 306
BIN

```
c:
  1: int a;
  2: void foo()
  3: {
  4:    register int b;
  5:    int c;
  6: }

<1>:  DW_TAG_subprogram
        DW_AT_name = foo
<2>:  DW_TAG_variable
        DW_AT_name = b
        DW_AT_type = <4>
        DW_AT_location = (DW_OP_reg0)
<3>:  DW_TAG_variable
        DW_AT_name = c
        DW_AT_type = <4>
        DW_AT_location =
              (DW_OP_fbreg: -12)
<4>:  DW_TAG_base_type
        DW_AT_name = int
        DW_AT_byte_size = 4
        DW_AT_encoding = signed
<5>:  DW_TAG_variable
        DW_AT_name = a
        DW_AT_type = <4>
        DW_AT_location = (DW_OP_addr: 0)
```

DWARF ENTRY 326

BLEU score 502

$$BLEU = BP * exp\left(\sum_{n=1}^{N} w_n \, log \, p_n\right) \quad (1)$$

$$BP = \begin{cases} 1, & if \, |g| > |r| \\ e^{\left(1 - \frac{|r|}{|g|}\right)}, & if \, |g| \le |r| \end{cases} \quad (2)$$

METEOR score 504

$$P_{unig} = \frac{m}{|g|}, R_{unig} = \frac{m}{|r|} \quad (3)$$

$$METEOR = \left(1 - \gamma * frag^{\beta}\right) * \frac{P_{unig} * R_{unig}}{\alpha * P_{unig} + (1 + \alpha) * R_{unig}} \quad (4)$$

ROUGE-L 506

$$R_{lcs} = \frac{LCS(r,g)}{|r|}, P_{lcs} = \frac{LCS(r,g)}{|g|} \quad (5)$$

$$F_{lcs} = \frac{(1 + \beta^2)R_{lcs}P_{lcs}}{R_{lcs} + \beta^2 P_{lcs}} \quad (6)$$

1. VALUE RANGE: [0,1]
2. THE HIGHER THE VALUE IS, THE BETTER THE BINARY CODE SUMMARIES ARE.
3. KEY FEATURE: EXACT MATCHING

FIG. 5

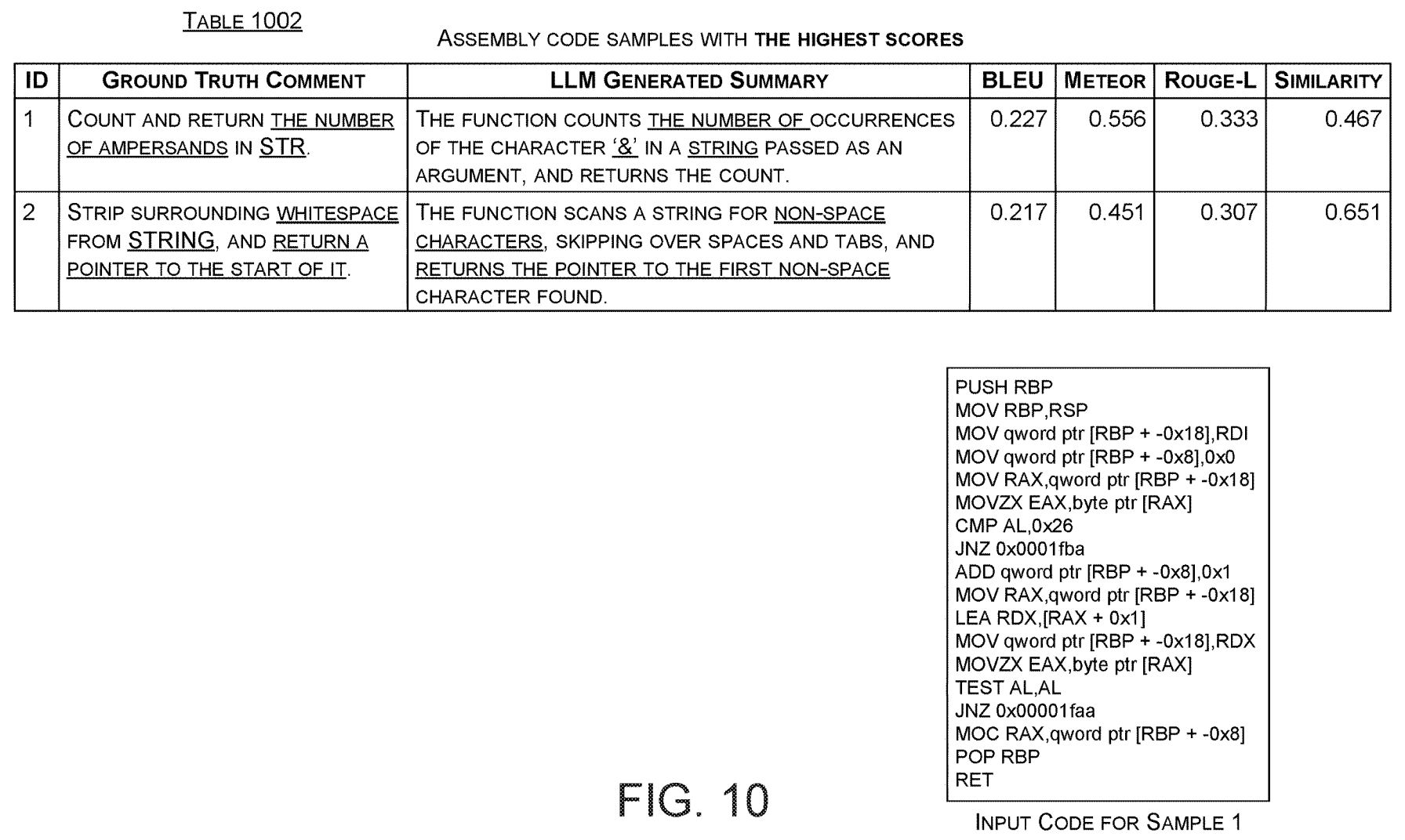

TABLE 1002

ASSEMBLY CODE SAMPLES WITH THE HIGHEST SCORES

| ID | GROUND TRUTH COMMENT | LLM GENERATED SUMMARY | BLEU | METEOR | ROUGE-L | SIMILARITY |
|---|---|---|---|---|---|---|
| 1 | COUNT AND RETURN THE NUMBER OF AMPERSANDS IN STR. | THE FUNCTION COUNTS THE NUMBER OF OCCURRENCES OF THE CHARACTER '&' IN A STRING PASSED AS AN ARGUMENT, AND RETURNS THE COUNT. | 0.227 | 0.556 | 0.333 | 0.467 |
| 2 | STRIP SURROUNDING WHITESPACE FROM STRING, AND RETURN A POINTER TO THE START OF IT. | THE FUNCTION SCANS A STRING FOR NON-SPACE CHARACTERS, SKIPPING OVER SPACES AND TABS, AND RETURNS THE POINTER TO THE FIRST NON-SPACE CHARACTER FOUND. | 0.217 | 0.451 | 0.307 | 0.651 |

```
PUSH RBP
MOV RBP,RSP
MOV qword ptr [RBP + -0x18],RDI
MOV qword ptr [RBP + -0x8],0x0
MOV RAX,qword ptr [RBP + -0x18]
MOVZX EAX,byte ptr [RAX]
CMP AL,0x26
JNZ 0x0001fba
ADD qword ptr [RBP + -0x8],0x1
MOV RAX,qword ptr [RBP + -0x18]
LEA RDX,[RAX + 0x1]
MOV qword ptr [RBP + -0x18],RDX
MOVZX EAX,byte ptr [RAX]
TEST AL,AL
JNZ 0x00001faa
MOC RAX,qword ptr [RBP + -0x8]
POP RBP
RET
```

INPUT CODE FOR SAMPLE 1

FIG. 10

TABLE 1102

ASSEMBLY CODE SAMPLES WITH THE MEDIAN SCORES

| ID | GROUND TRUTH COMMENT | LLM GENERATED SUMMARY | BLEU | METEOR | ROUGE-L | SIMILARITY |
|---|---|---|---|---|---|---|
| 3 | COMPARE THE SPECIFIED TWO CHARACTERS. IF THE CHARACTERS MATCHED, RETURN 1. OTHERWISE RETURN 0. | THE FUNCTION SAVES REGISTERS, PERFORMS ARITHMETIC OPERATIONS, CALLS ANOTHER FUNCTION AND MAKES CONDITIONAL JUMPS BASED ON THE RESULTS. IT ALSO REGISTERS BEFORE RETURNING. | 0.038 | 0.098 | 0.150 | 0.210 |
| 4 | ALLOCATE ZEROED MEMORY FOR N ELEMENTS OF S BYTES, WITH ERROR CHECKING. S MUST BE NONZERO. | THE FUNCTION MULTIPLIES TWO NUMBERS, CHECKS FOR OVERFLOW, SETS A FLAG BASED ON THE RESULT, AND MAKES CONDITIONAL JUMPS AND CALLS. | 0.038 | 0.029 | 0.047 | 0.143 |

```
PUSH RBP
MOV RBP,RSP
SUB RSP,0x20
MOV qword ptr [RBP + -0x18],RDI
MOV qword ptr [RBP + -0x20],RSI
MOV RAX,qword ptr [RAX + -0x18]
MOV RDX,qword ptr [RAX + 0x10]
MOV RAX,qword ptr [RAX + -0x20]
MOV RAX,qword ptr [RAX + 0x10]
CMP RDX,RAX
JNZ 0X00008E73
MOV RDX,qword ptr [RBP + -0X20]
MOV RAX,qword ptr [RBP + -0X18]
MOV RSI,RDX
MOV RDI,RAX
CALL 0X00008df0
JMP 0x00008ed3
... // skip for simplicity
SUB EDX,EAX
MOV EAX,EDX
LEAVE
RET
```

INPUT CODE FOR SAMPLE 3

FIG. 11

TABLE 1202

ASSEMBLY CODE SAMPLES WITH THE LOWEST SCORES

| ID | GROUND TRUTH COMMENT | LLM GENERATED SUMMARY | BLEU | METEOR | ROUGE-L | SIMILARITY |
|---|---|---|---|---|---|---|
| 5 | CREATE AN ENTRY IN A COFF DEBUG MERGE HASH TABLE. | THE FUNCTION PERFORMS SOME OPERATIONS ON REGISTERS, CHECKS CONDITIONS, AND MAKES TWO FUNCTION CALLS. IT ALSO INCLUDES CONDITIONAL JUMPS AN MEMORY MANIPULATION. | 0 | 0 | 0 | 0.044 |
| 6 | MAKE SURE SEC INFO TYPE IS CLEARED IF SEC INFO IS CLEARED TOO. | THE FUNCTION SAVES RBX REGISTER, COPIES RSI TO RBX, COMPARES IT, CONDITIONAL JUMPS, CALLS ANOTHER FUNCTION, RESTORES RBX, AND RETURNS. | 0 | 0 | 0 | -0.017 |

```
PUSH RBP
RUSH RBX
SUB RSP,0x8
MOV RBX,RSI
MOV RBP,RDX
TEST RDI,RDI
JZ 0x000a5f33
MOV RDX,RBP
MOV RSI,RBX
CALL 0x0003x4aaa
TEST RAX,RAX
JZ 0x000a5f2c
MOC qword ptr [RAX + 0x18],0x0
ADD RSP,0x8
POP RBX
POP RBP
RET
MOV ESI, 0x20
MOV RDI,RBX
CALL 0x0003x448
TEST RAX,RAX
JZ 0x000a5f2c
MOV RDI,RAX
JMP 0x000a5f14
```

INPUT CODE FOR SAMPLE 5

FIG. 12

TABLE 1302    DECOMPILED CODE (STRIPPED) SAMPLES WITH THE HIGHEST SCORES

| ID | GROUND TRUTH COMMENT | LLM GENERATED SUMMARY | BLEU | METEOR | ROUGE-L | SIMILARITY |
|---|---|---|---|---|---|---|
| 1 | RETURN 1 IF PRIME, 0 IF COMPOSITE | THE FUNCTION CHECKS IF THE INPUT NUMBER IS PRIME. IT RETURNS 1 IF THE NUMBER IS PRIME, AND 0 IF IT IS NOT. | 0.216 | 0.654 | 0.400 | 0.481 |
| 2 | RETURN THE LENGTH OF THE MAXIMUM INITIAL SEGMENT | THE FUNCTION CALCULATES THE LENGTH OF THE INITIAL SEGMENT OF A STRING THAT CONTAINS ONLY CHARACTERS IN ANOTHER STRING, BUT CONTAINS BAD DATA. | 0.458 | 0.639 | 0.55 | 0.296 |

```
uint FUN_0000c2fb(ulong param_1)

{
    ulong uVar1;
    uint uVar2;
    ulong local_20;

if (param_1 < 0x20) {
        uVar2 = (uint)(0xa08a28ac >> ((byte)param_1 &
0x3f)) & 1
    }
    else if ((param_1 & 1) ==0) {
        uVar2 = 0;
    }
    else if ((param_1 % 3 == 0) {
        uVar2 = 0;
    }

// skip for simplicity
    return uVar2;
}
```

INPUT CODE FOR SAMPLE 1

FIG. 13

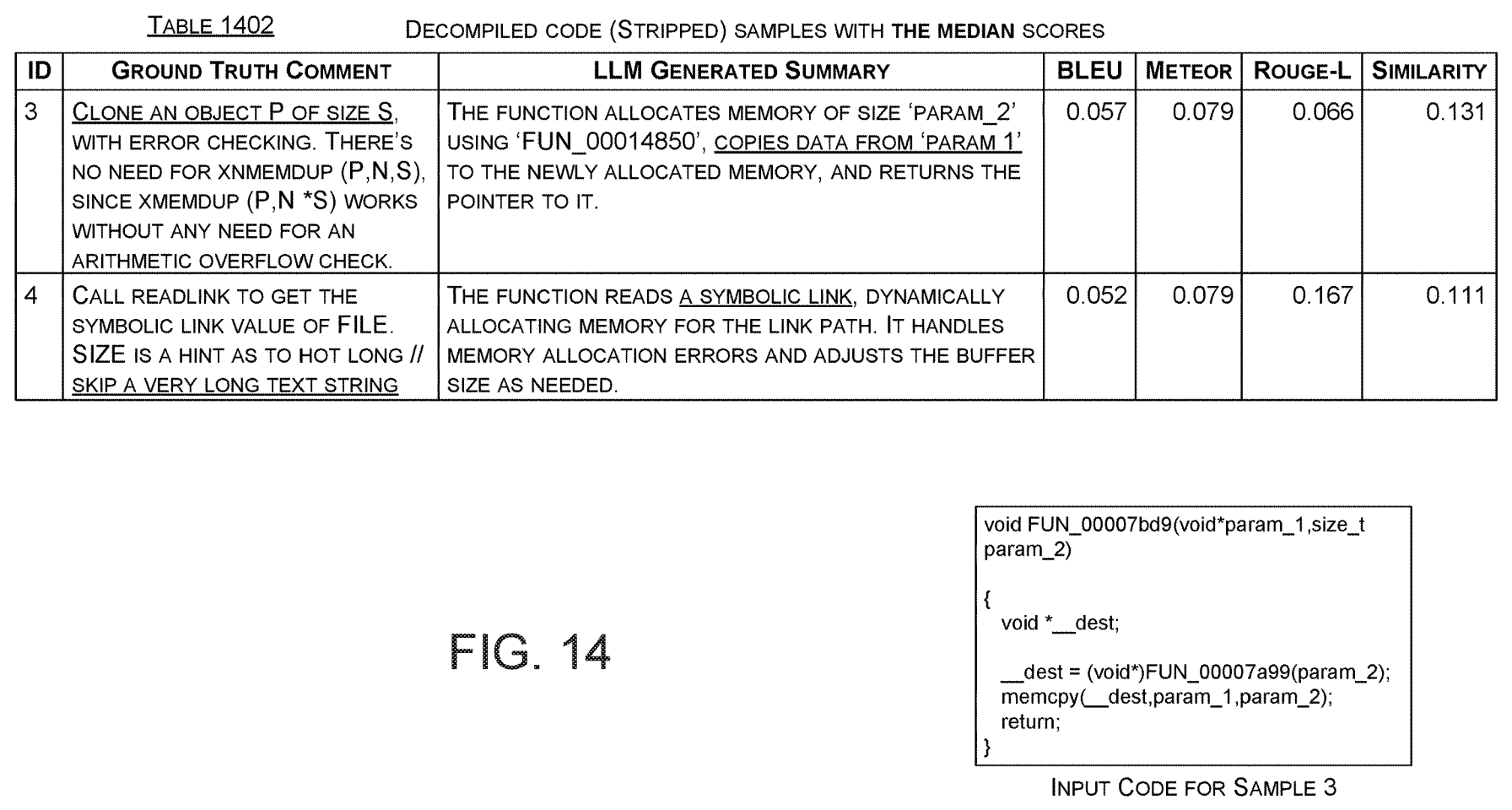

TABLE 1402     DECOMPILED CODE (STRIPPED) SAMPLES WITH THE MEDIAN SCORES

| ID | GROUND TRUTH COMMENT | LLM GENERATED SUMMARY | BLEU | METEOR | ROUGE-L | SIMILARITY |
|---|---|---|---|---|---|---|
| 3 | CLONE AN OBJECT P OF SIZE S, WITH ERROR CHECKING. THERE'S NO NEED FOR XNMEMDUP (P,N,S), SINCE XMEMDUP (P,N *S) WORKS WITHOUT ANY NEED FOR AN ARITHMETIC OVERFLOW CHECK. | THE FUNCTION ALLOCATES MEMORY OF SIZE 'PARAM_2' USING 'FUN_00014850', COPIES DATA FROM 'PARAM 1' TO THE NEWLY ALLOCATED MEMORY, AND RETURNS THE POINTER TO IT. | 0.057 | 0.079 | 0.066 | 0.131 |
| 4 | CALL READLINK TO GET THE SYMBOLIC LINK VALUE OF FILE. SIZE IS A HINT AS TO HOT LONG // SKIP A VERY LONG TEXT STRING | THE FUNCTION READS A SYMBOLIC LINK, DYNAMICALLY ALLOCATING MEMORY FOR THE LINK PATH. IT HANDLES MEMORY ALLOCATION ERRORS AND ADJUSTS THE BUFFER SIZE AS NEEDED. | 0.052 | 0.079 | 0.167 | 0.111 |

```
void FUN_00007bd9(void*param_1,size_t
param_2)
{
    void * __dest;

__dest = (void*)FUN_00007a99(param_2);
    memcpy(__dest,param_1,param_2);
    return;
}
```

INPUT CODE FOR SAMPLE 3

FIG. 14

TABLE 1502     DECOMPILED CODE (STRIPPED) SAMPLES WITH THE LOWEST SCORES

| ID | GROUND TRUTH COMMENT | LLM GENERATED SUMMARY | BLEU | METEOR | ROUGE-L | SIMILARITY |
|---|---|---|---|---|---|---|
| 5 | ADD AN UTF-16 ENCODED STRING TO AN OBSTACK. | THE FUNCTION TAKES THERE PARAMETERS, CALLS ANOTHER FUNCTION WITH THE FIRST AND TWICE THE THIRD PARAMETER, THEN ITERATES OVER THE SECOND PARAMETER, CALLING A FUNCTION ON EACH ITERATION. | 0 | 0 | 0 | -0.133 |

```
void FUN_0000fc18(undefined8
param_1,undefined2*param_2,long param_3)
{
  long local_20;
  undefined2*local_18;

FUN_0000fa8f(param_1,(int)param_3*2);
  local_18 = param_2;
  for(local_20 = param_3; local_20 !=0; local_20 =
local_20 + -1){
    FUN_0000r9c9(param_1,*local_18);
    local_18 = local_18 + 1;
  }
  return;
}
```

INPUT CODE FOR SAMPLE 5

FIG. 15

METHOD <u>1800</u>

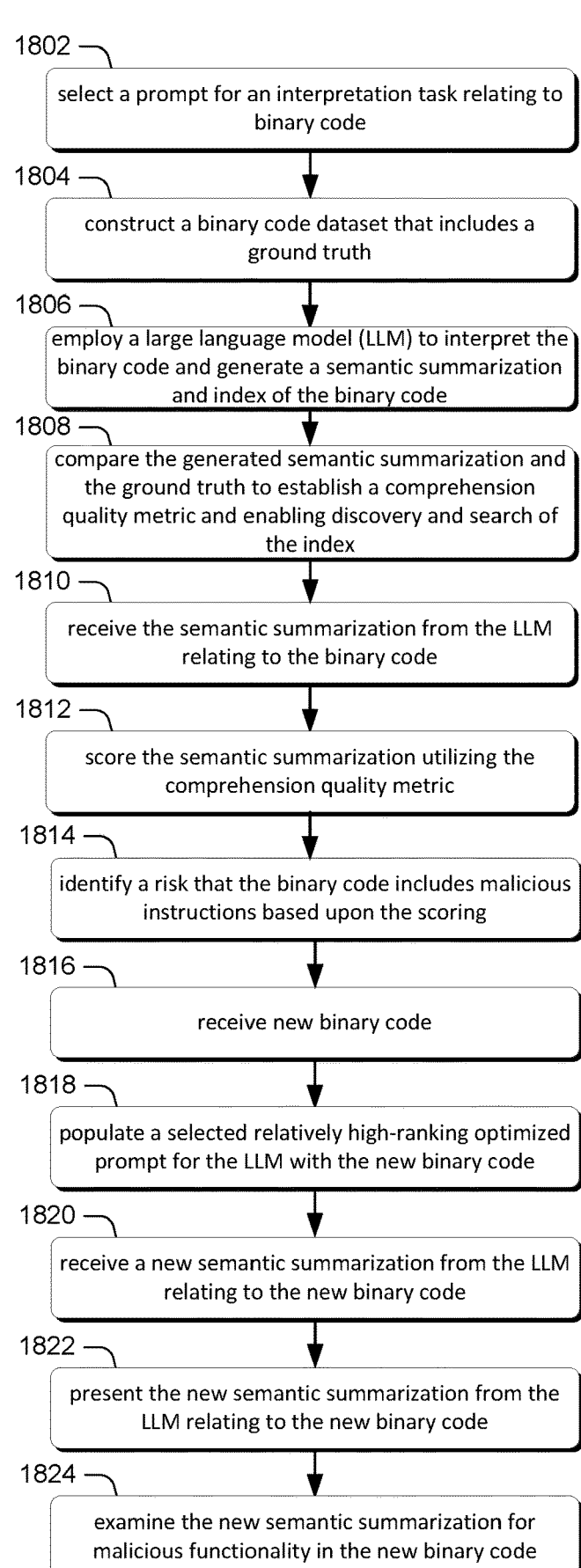

1802 — select a prompt for an interpretation task relating to binary code

1804 — construct a binary code dataset that includes a ground truth

1806 — employ a large language model (LLM) to interpret the binary code and generate a semantic summarization and index of the binary code 1808 — compare the generated semantic summarization and the ground truth to establish a comprehension quality metric and enabling discovery and search of the index 1810 — receive the semantic summarization from the LLM relating to the binary code 1812 — score the semantic summarization utilizing the comprehension quality metric 1814 — identify a risk that the binary code includes malicious instructions based upon the scoring 1816 — receive new binary code 1818 — populate a selected relatively high-ranking optimized prompt for the LLM with the new binary code 1820 — receive a new semantic summarization from the LLM relating to the new binary code 1822 — present the new semantic summarization from the LLM relating to the new binary code 1824 — examine the new semantic summarization for malicious functionality in the new binary code

FIG. 18

SYSTEM 1900

1916(1)

APPLICATION(S) 1918

BINARY CODE SUMMARIZATION TOOL 1914

OS 1920

HARDWARE 1922

PROCESSOR 1910

COMM 1908

STORAGE 1912

1916(2)

SHARED RESOURCES 1924

PROCESSOR 1910

COMM 1908

STORAGE 1912

INTERFACE 1928

DEDICATED RESOURCES 1926

BINARY CODE SUMMARIZATION TOOL 1914

DEVICE 1902(3)

CLOUD RESOURCES 1904

NETWORK 1906

NETWORK 1906

DEVICE 1902(1)

NETWORK 1906

DEVICE 1902(2)

NETWORK 1906

AUTOMATIC BINARY CODE UNDERSTANDING

BACKGROUND

Software programmers and other knowledgeable individuals write programs (e.g., source code) in high level programming languages. The functionality of the source code is readily understandable to other knowledgeable individuals. However, computers do not understand source code. Compilers or other tools are used to compile (e.g., translate) the high-level source code to low-level machine code that computers understand.

The resulting machine code is packaged in binary executable format. Normally, developers will enable a debugging option during compilation, which is very useful to allow humans to understand the machine code, such as for debugging. At the low-level, the debugging information is stored as Dwarf entries, which contain the high-level semantic information, such as function names, variable names, and the source code line numbers.

After the initial program development stage, the debugging information is stripped away for many reasons, such as file size reduction and/or intellectual property protection that prohibits reverse engineering code semantics. Therefore, the resulting stripped binaries only contain the machine code information and are missing the high-level semantic information, which makes it very difficult to understand the code semantics.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 1-8 and 19 illustrate example systems that can implement example binary code semantic summarization concepts consistent with some implementations of the present concepts.

FIGS. 10-15 illustrate example binary code semantic summarizations that are consistent with some implementations of the present concepts.

FIG. 18 illustrates an example flowchart that is consistent with some implementations of the present concepts.

DETAILED DESCRIPTION

Overview

Figure 1:
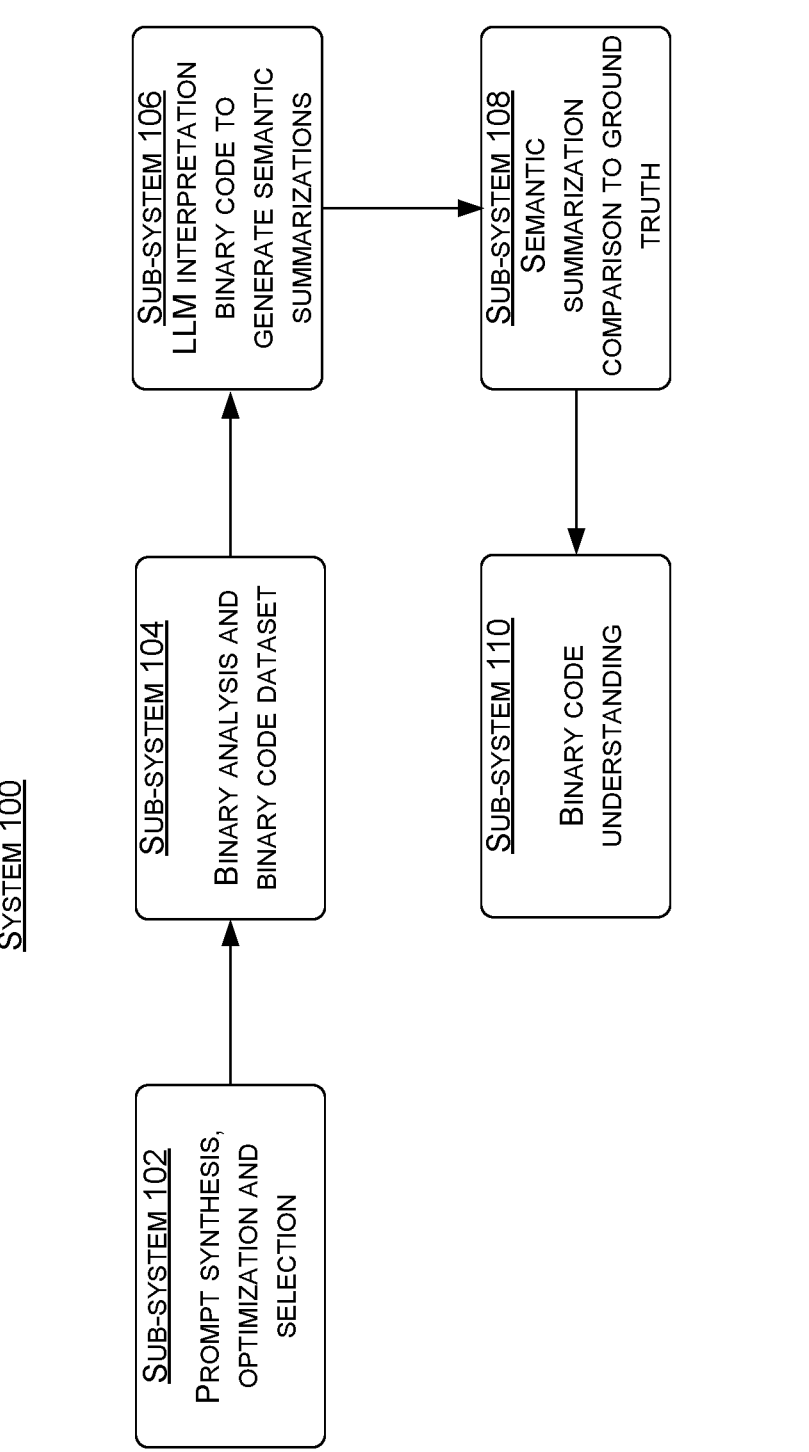

Many software programs, such as commercial off the shelf (COTS) software predominately consist of closed-source applications distributed in a stripped binary executable format. However, COTS binaries are prone to vulnerabilities and bugs, which can have a significant impact on billions of end users. Identifying these vulnerabilities and bugs necessitates a thorough comprehension of binary code semantics. Nevertheless, COTS binaries are stripped, meaning that compiler-generated debugging information, such as function and variable names, is removed for various reasons, including reducing the size of the binary files. Consequently, comprehending binary code becomes exceedingly challenging. To address this technical problem, the present concepts provide a technical solution that utilizes generative artificial intelligence, such as general purpose large language models (LLM) to grasp the semantics of code in stripped binaries. General purpose LLMs have demonstrated good capabilities in understanding high level source code. This understanding offers the potential to transfer their knowledge on high level code understanding to binary code, despite the significantly reduced semantic information available in binary code.

Binary code can be represented in various formats. Existing techniques have tried to encode binary code semantics in different formats. For example, SymLM encodes binary function semantics by the assembly code generated by disassembler, considering the effects of function calls. varBERT improves the decompiler output by predicting variable names in binaries. While different techniques have different inputs, it is still unknown which binary format is the best one for LLMs to understand.

The present concepts provide a technical solution for automated binary code understanding. The technical solution can utilize a pre-trained general-purpose large language model (LLM) like OpenAI's ChatGPT and/or GPT-4, among others, to interpret various forms of binary code. Specific examples are described below starting relative to FIG. 1.

In-context learning can generalize LLM models such as GPT-3 on out-of-domain tasks by learning context information from in-context instruction (aka zero-shot learning) or demonstration samples (aka few-shot learning). Specifically, in-context learning involves adding n in-context demonstration pairs (Xd, Yd), where Xd and Yd are sample inputs and outputs, before the test input:

$$X_{in} = \{(X_d^i, Y_d^i)_i^n; X_{test}\}$$

where the demonstration samples are concatenated with the test input Xtest to form the LLM query input Xin.

Although in-context learning has demonstrated great cross-task transferability, it still struggles to generalize on out-domain tasks. To address such issues, prompt tuning can modify the input to LLMs without modifying the model parameters. Formally, the prompt tuning input can be expressed as:

$$X_{PT} = \{E; X_{test}\}$$

where E={e1, ..., em} is the tunable prompt embeddings, which is encoded from the sequences of the demonstration inputs Xd and the outputs Yd. Xd={x1, ..., xu} and Yd={y1, ..., yv} denote the sequences of input and output tokens.

The widespread adoption of Large Language Models (LLMs) has been propelled by significant advances in various machine learning tasks, e.g., image classification and machine translation, enabling the scaling of LLM size to billions of parameters and utilization of billions of training samples. LLMs are trained to encompass knowledge from diverse domains based on the pretraining approaches, e.g., mask token prediction and next sentence generation. LLMs are then employed in downstream tasks through either fine-tuning or prompting approaches. Fine-tuning is a process of updating model parameters by minimizing the loss on task-specific datasets, rendering the optimal performance on downstream tasks. However, fine-tuning can be costly (e.g., resource intensive) due to the need of weight updates and model training, which may not be feasible because of the unavailability of sufficient training datasets, hardware resources, and/or no access to the LLMs themselves. Meanwhile, prompting involves directly executing model inference on LLMs without training them with downstream task data. To offer LLMs with in-context data, prompts are designed with examples of queries and generation results, which is often known as in-context learning or few-shot learning.

Prompt engineering has emerged as an instinctive and effective means of human interaction with and utilization of generalist models, such as large language models (LLM), within the domain of Natural Language Processing (NLP). Its versatility has led to widespread adoption in various NLP tasks. However, to employ prompting effectively with LLMs, it is necessary to carefully construct prompts, either manually or automatically, as these models do not interpret prompts in the same way as humans. While numerous successful techniques for prompt tuning exist, which optimize prompts in a continuous space using gradient-based methods, this approach becomes less viable at larger scales due to the computational burden associated with calculating gradients. Furthermore, increasing reliance on model access through application program interfaces (APIs) that lack gradient support further diminishes the feasibility of gradient-based optimization.

BINT5 is a binary code summarization tool finetuned from the transformer based CodeT5-base model. It has several shortcomings. First, it only focused on Ghidra-generated decompiled code which doesn't give general performance for general decompiler-output code. However, the code generated from different compilers is dramatically different. Second, the dataset only covers x86-32 binaries. Third, BINT5 compares the summarization performance across optimization levels but its dataset is imbalanced regarding optimization levels, i.e., it's binaries with different optimization levels follow abnormal distribution. For example, the decompiled functions of -O0, -O1, -O2, and -O3 optimization levels follow the rough ratio of 1:2:6:2. However, compiling source projects into binaries with different optimization levels usually render far more -O0 functions compared to -O1 through -O3. Therefore, training on such an imbalanced dataset doesn't provide a fair performance comparison across different optimization levels.

Besides BINT5, there are also tools for binary code semantic modeling which map semantic encodings into function names. For example, SymLM models binary code semantics preserved in calling context and execution behaviors with a pretrained large language model. However, the function names generated by such tools give very concentrated and short semantic descriptions but fail to provide enough details.

Binary code is stored as raw bytes in binary executable files. To reverse engineer binary code semantics, security professionals usually use disassemblers and decompilers to generate low-level code representations, i.e., assembly code and decompiled code. In addition, reverse engineers also may generate intermediate representations (IR) for binaries. The benefit for IR analysis is the static single assignment (SSA) representation that assigns a unique name to each variable in the code, ensuring that each variable is only assigned a value once. The use of SSA form has several benefits in program analysis and optimization. It simplifies many compiler optimizations by making it easier to reason about the program's control flow and data dependencies. SSA form allows for better dead code elimination, constant propagation, and register allocation, among other optimizations. When faced with so many binary code representations, existing solutions use different representations to learn binary code semantics. For example, some tools take as input raw decompiler output, i.e., decompiled code to infer variable types. One such tool uses the disassembler output, that is, the assembly code, to predict data types. It is not clear which binary code representation is better for binary code summarization.

The commercial off-the-shelf (COTS) binaries are compiled with different compilation settings, i.e., compilers (e.g., GCC and Clang), computer architectures (e.g., x64, x86, and ARM, for example), and optimization levels (e.g., O0, O1 and O2). Compiling source projects with different compilation settings results in diverse binaries. The different computer architectures generate code with different instruction sets, which are the different vocabularies for machine learning models. Function inlining is popular for binaries compiled with higher optimization levels.

Large language models (LLMs), such as OpenAI GPT-4 and ChatGPT, Google Bard and PaLM 2, Meta Llama 2, among others, are pre-trained on a very large corpus of text and source code, which is semantically different from binary code, e.g., binary raw bytes, assembly code, and decompiler generated code. Moreover, there are gaps between the pre-training and fine-tuning processes of LLMs. For LLMs from the BERT and T5 families, they are generally pre-trained using the masked language modeling (MLM) objective. During pretraining, random tokens are masked in input sentences and LLMs learn to predict these masked tokens based on the surrounding context.

OpenAI models, such as GPT-2, are pre-trained using an autoregressive language modeling objective, which predicts the next words in a sequence conditioned on the previous words. This approach allows LLMs to generate coherent and contextually appropriate text. However, when leveraging these LLMs to summarize binary code, the input involves only binary code, e.g., binary raw bytes. For the LLMs in the BERT family, the learning objective changes to a cross-modal generation task. The disparity in inputs and objectives during pre-training and fine-tuning makes it challenging to fully leverage the knowledge contained within pre-trained models. As a result, this often leads to suboptimal outcomes in downstream tasks.

In order to address the semantic gap between pretraining and the downstream binary code summarization task, a common approach is to fine tune large language models (LLMs) using domain-specific datasets. This typically involves employing parameter-efficient finetuning methods, where the majority of the LLM's parameters are kept frozen and only a small number of task-specific parameters are adjusted. However, performing full-model finetuning requires a prohibitively large data set, and it can be computationally expensive, especially on consumer-grade hardware, making it challenging for wider accessibility in LLM research and deployment. Therefore, the present technical solutions solve this problem with prompt tuning and in-context learning. Prompt tuning is introduced as a solution to overcome resource limitations associated with traditional fine-tuning methods. For instance, when summarizing binary code, prompt tuning involves constructing the input by combining a contextual instruction, such as "You are a helpful AI assistant trained to understand binary code," with a natural language prompt. This allows the language models to capture the semantics of the binary code.

FIG. 1 shows an example system 100 for automated binary code understanding. The present automated binary code understanding concepts may be referred to as 'BinGPT.' This system 100 utilizes a pre-trained general-purpose large language model (LLM) like OpenAI's ChatGPT and/or GPT-4, among others, to interpret various forms of binary code. The workflow of this BinGPT system is built around five sub-systems 102-110. These sub-systems are introduced directly below and explained in more detail relative to subsequent FIGS.

Sub-system 102 relates to prompts. As mentioned above, the quality of the prompt provided to an LLM affects the value of information generated by LLM. In these scenarios, the prompts contain a natural language portion and a binary code portion. The sub-system 102 can synthesize a list of prompts, optimize the prompts, and select high ranking (and potentially the best prompt) suitable for a binary code interpretation task.

Sub-system 104 relates to binary analysis. The sub-system 104 performs binary analysis and constructs a large binary code dataset that can provide a ground truth. The large binary code dataset can include binary code samples with accompanying source code that contains information about the functionality of the source code. The information can be in the form of notes or comments made by the programmer describing what functionality (portions of) the source code are supposed to accomplish. The notes may also include other information, such as definitions of variables in the source code. These notes can be treated as a ground truth explanation of the functionality of the source code.

Sub-system 106 relates to employing large language models to interpret the binary code in the prompt. The sub-system 106 generates semantic summarizations of the binary code. The semantic summarizations can be viewed as explanations of the functionality performed by the binary code.

Sub-system 108 relates to assessing the generated semantic summaries and juxtaposing, or otherwise comparing, them against the ground truth. Recall that the ground truth explanations include information about the functionality of the source code. The semantic summarizations include information about the functionality of the binary code. This comparison enables establishment of a comprehension quality measurement. Stated another way, the comparison determines how well the functionality of the binary code described by an individual LLM given an individual prompt matches the functionality of the corresponding source code. The comprehension quality measurement provides a benchmark for evaluating understanding of the binary code.

Sub-system 110 relates to binary code understanding or comprehension. From one perspective, a first comprehension question is whether a given prompt and LLM are producing relatively accurate sematic summarizations. A relatively accurate semantic summarization should have a relatively high similarity score with the ground truth. However, if the semantic summarization is substantially different (e.g., lower similarity score) the binary code may contain malicious code. Thus, a second comprehension question relates to what potentially malicious functionality is represented in the semantic summarization. For instance, a vendor may supply the binary code and state that the binary code performs functions A, B, and C. However, the semantic summarization indicates that the binary code actually performs functions A, B, C, and D. In this case, a potential risk has been identified. The potential risk can be further evaluated (e.g., is function D potentially a malicious functionality, such as a key tracker, for instance). As user herein, 'malicious functionality' includes both nefarious functionalities (e.g., digital attacks) and unintended functionalities (e.g., bugs).

Sub-system 110 can further evaluate this potential risk in the binary code and/or flag the binary code and semantic summarization for further evaluation of the risk to be performed by another system and/or by a human. From one perspective, this sub-system utilizes the established comprehension quality measurement from sub-system 108 alongside the LLM's output code summarization to understand and score comprehension of binary code.

The sub-system 110 can also be applied to new binary code samples to determine functionalities performed by the new binary code. These new binary code samples can be binary code samples for which a ground truth is available or unavailable. The new binary code can be combined with natural language in a prompt for a specific LLM. The natural language can be selected from relatively high-ranking prompts as determined by sub-system 102. Sub-system 110 can receive the resultant semantic summarization from the LLM and examine the semantic summarization for malicious functionalities.

Existing LLM-based binary code comprehension solutions focus solely on recovering binary function names. However, the present technical solutions, including system 100 outshine these existing solutions in at least two primary ways. First, binary code semantic summaries provided by sub-system 106 offer a more comprehensive understanding, transcending the mere binary function names. Second, the present implementations are built based in part on a comprehension quality score (e.g., the comprehension quality measurement provided by sub-system 108) derived from a large set of open-source ground truth data.

One advantage of having a comprehension quality score is that it provides a novel standardized technique of measuring the ability of the LLM to understand and summarize binary code. This novel standardized technique ensures consistency and accuracy across different binary codes. The novel standardized technique essentially serves as a yardstick against which all semantic summaries are evaluated, enabling the present implementations to determine the quality of the LLM's semantic summarization. This allows the system to be refined continually, improving its effectiveness and reliability over time.

FIG. 2 shows an example sub-system 102 and example operations that can be performed by the sub-system. The operations include initial prompt synthesis as indicated at 202. In some cases, prompt synthesis entails causing LLMs to generate the potential prompts by giving them the example binary code and semantic summaries as indicated at 204. Alternatively or additionally, human generated prompts can be generated by leveraging experience with prompt engineering LLMs as indicated at 206. These two sets of prompts can be utilized to cause the LLMs to generate a list of prompt variants as indicated at 208. The prompt variants have the same semantics as the input prompts. The LLMs are used to optimize the prompts as indicated at 210.

The generated and optimized prompts are then used for binary code summarization as indicated at 212. The binary code summarization is achieved by providing some binary code samples 214 to a generator 216.

Finally, the prompts can be evaluated at 218 by comparing the generated binary code semantic summaries and ground truth comments. The evaluation can rank the prompts (e.g., prompts that produce semantic summaries that are semantically closer to the ground truths will rank higher). The high-ranking prompts (and potentially the best prompts) can be selected.

Figure 3A:
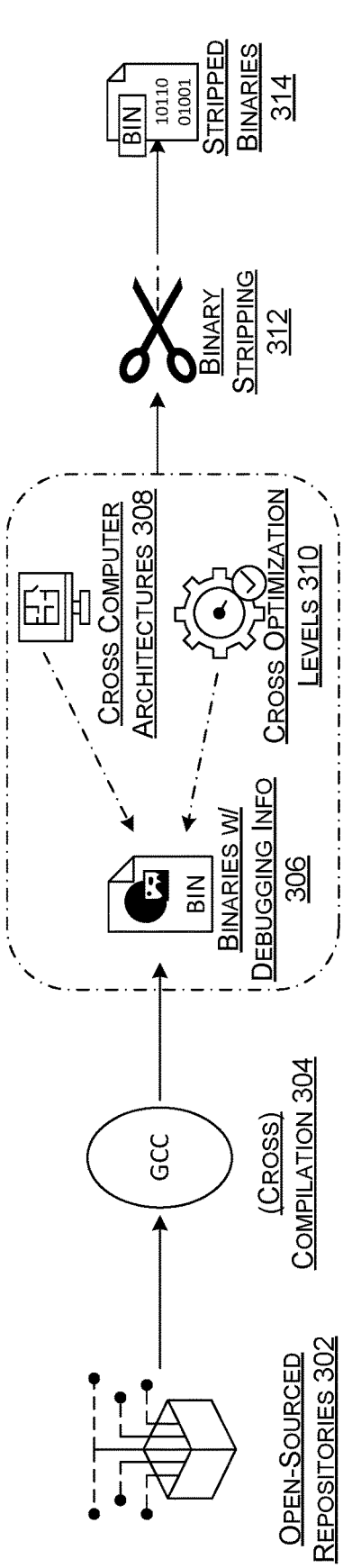
Figure 3C:
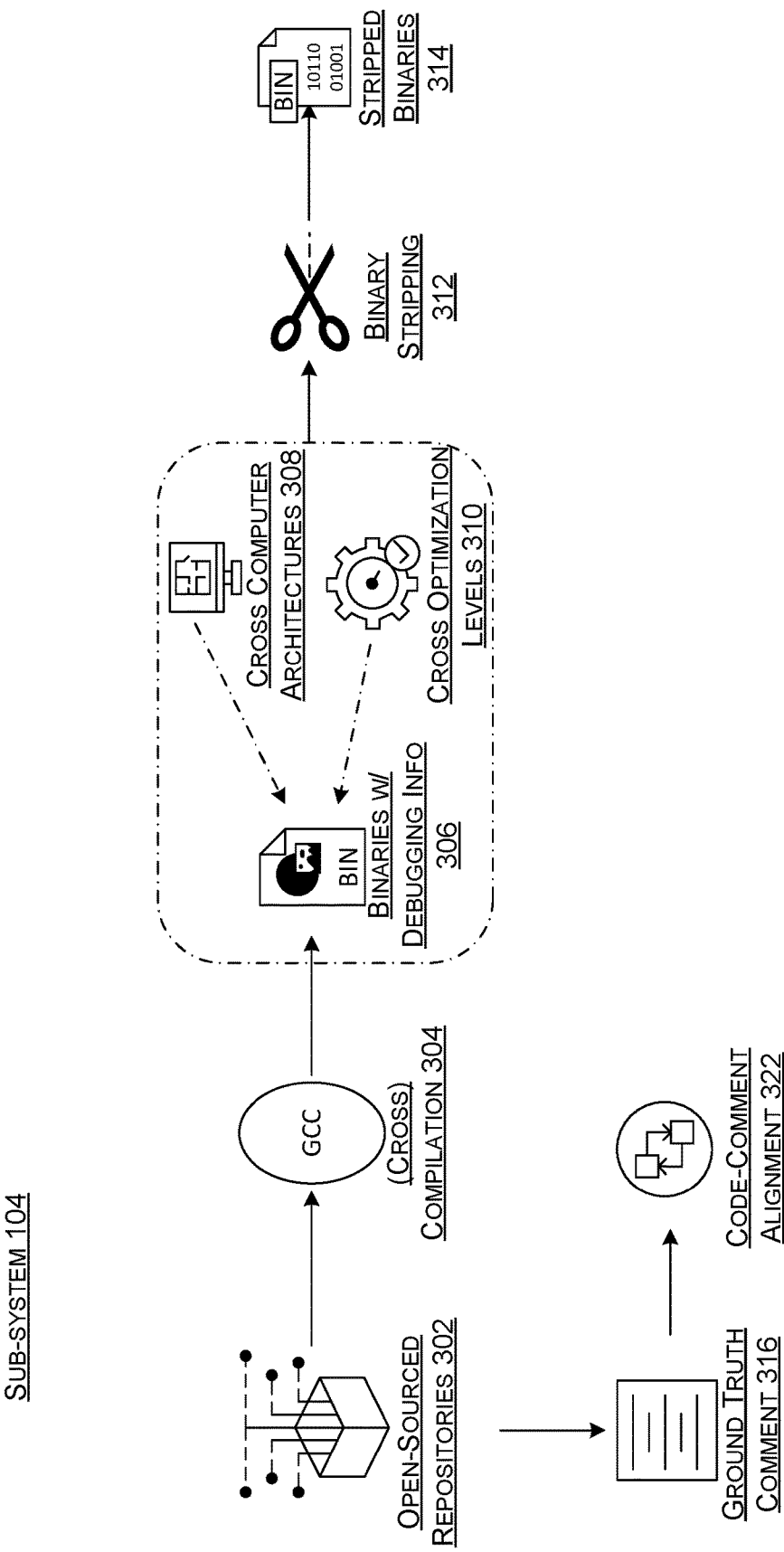

FIGS. 3A-3C collectively show an example sub-system 104 and example operations that can be performed by the sub-system. Sub-system 104 relates to binary analysis. As shown in FIG. 3A, this can involve generating a binary code dataset with a set of binary analysis tools. For instance, the source code of a list of open-sourced software repositories, such as GNU software repositories, can be curated as indicated at 302. Next, the source code can be compiled as indicated at 304. This can produce binaries with debugging information as indicated at 306. To get the diverse binary code, various compilation settings are enabled, including different cross computer architectures 308 and cross optimizations 310.

Binary stripping can be performed on the binaries as indicated at 312 to produce stripped binaries 314. This mimics the real-world software deployment process, which results in stripped binaries.

Some implementations obtain the binary code dataset with general representations by compiling the open-source projects into various binaries with different compilation settings. Specifically, in one instance 44 opensource projects were collected from GNU Software. These projects include some projects that are widely used in binary reverse engineering research, such as coreutils, binutils, and findutils. Table I lists the projects used in an example dataset. The projects are compiled into four computer architectures (x86, x64, ARM, and MIPS) and 4 optimization levels (O0-O3), which results in 8,760 unique binaries. The present concepts can be used with other computer architectures and/or optimizations. Obfuscation techniques are also applied to the projects to further obfuscate the binary code. Specifically, binaries can be obfuscated with the LLVM Obfuscator by enabling the XY options.

TABLE 1

| Project | Version | Project | Version |
|---|---|---|---|
| coreutils | 8.32 | mpfr | 4.0.2 |
| findutils | 4.9.0 | curl | 7.86.0 |
| wget2 | 2.0.1 | libiconv | 1.17 |
| mailutils | 3.8 | units | 2.22 |
| autoconf | 2.71 | readline | 8.2 |
| nettle | 3.8 | inetutils | 2.4 |
| bison | 3.8 | adns | 1.6.0 |
| lightning | 2.2.0 | datamash | 1.8 |
| bash | 5.2 | ncurses | 6.3 |
| dico | 2.11 | libunistring | 1.0 |
| sed | 4.9 | nano | 7.0 |
| less | 608 | libpng | 1.6.39 |
| libtool | 2.4.7 | libidn2 | 2.3.4 |
| diffutils | 3.8 | gmp | 6.2.1 |
| gama | 2.05 | gettext | 0.21 |
| gawk | 5.2.1 | grep | 3.8 |
| cflow | 1.7 | gzip | 1.12 |
| gss | 1.0.4 | freeipmi | 1.6.10 |
| openssl | 3.0.6 | libredwg | 0.12 |
| tar | 1.34 | texinfo | 7.0 |
| binutils | 2.39 | poke | 2.4 |
| libmicrohttpd | 0.9.75 | direvent | 5.2 |

An example evaluation environment is a 64-bit Ubuntu desktop. Compiling and stripping binaries with different computer architectures as the host machine tends to require cross compilers and cross-stripping tools. For this, a novel cross-compilation and cross-stripping tool was employed. Cross-compilers, arm-linux-gnueabihf-gcc and mipsel-linux-gnu-gcc for ARM and MIPS binaries were used to compile the binary on a 64-bit Linux machine. For binary stripping, all symbol names were removed using the strip command, in which arm-linux-gnueabihf-strip and mipsel-linux-gnu-strip were used to strip the ARM and MIPS binaries.

FIG. 3B shows that ground truth comments 316 are collected for the generated binaries 302. An example of source code is shown at 318 with an associated ground truth comment 320. The source files in each project were parsed to collect the ground-truth comments. For this, open source tools were searched for source code parsing. The search produced three potential candidates in the form of: comment_parser, srcML, and pycparser. srcML requires converting source files into XML files, which need additional parsing efforts. pycparser requires preprocessing source files, which requires library files. Therefore, comment_parser was employed to achieve the source code parsing. comment_parser is the lightest among the tools and thus resource usage was reduced.

comment_parser extracts comments from source files with corresponding line numbers. However, it cannot automatically identify the function associated with each comment. This issue is addressed by designing an algorithm to associate comments with each function. Although one function comment convention is to put function descriptions in header files, investigation of 450 randomly selected source functions across different source projects shows that (1) most functions are not commented on, (2) developers rarely comment on function declarations in header files, and (3) even when developers comment on function declarations in header files, they usually reuse such comments and/or add more information to comment function implementations in source files. Therefore, the present focus is on parsing comments in the source files.

One implementation first extracts comments and their line numbers from the source files using the comment_parser. Each comment is iterated within the source files. The implementation checks whether there is a function signature below each comment, which is treated as the function descriptions for identified functions. However, some functions defined in the source files may not be included in the binaries, and there may be some parsing errors. To address such issues, the functions are cross-validated from the debugging symbols. That is, descriptions are kept only for functions that appear in the binaries.

During source file parsing, some functions, such as the main functions, tend to be defined multiple times in the same source file or across multiple source files. To align the functions in the source code and those in the binaries, source function names are matched and functions in the binaries with debugging symbols. Therefore, it is challenging to identify the correct matching if the functions with the same name are given different comments. Such comments are defined as ambiguous comments, and the functions with ambiguous comments are removed from the dataset. For example, in the poke-2.4 project, the source code parser identifies 1,026 unique functions with comments. 144 functions are defined multiple times, and 30 functions are defined with different comments, i.e., with ambiguous comments. This implementation duplicates the functions with the same function comments and removes the functions with ambiguous comments. This process results in the function comment dataset. For example, in this case the number of unique functions after cleaning is 996. Overall, in this implementation the source project parser extracted 40,046 unique functions with comments from source projects and 780 functions are associated with ambiguous comments. After cleaning, there are 39,266 functions in the dataset.

Although functions are defined in source projects, they may not be used in compilation. For example, developers can use the #if macro to selectively compile functions into binaries. To remove such uncompiled functions, this implementation first collects all functions from binaries compiled from each source project. Ghidra is used to analyze the Dwarf entries of binaries and identify functions and their names, which results in 161,615 functions. For binaries from a specific project, this implementation identifies all unique functions by name and then checks the overlap between binary functions and source functions based on function names. This matching process identified 18,239 source functions compiled into binaries.

FIG. 3C adds the source code ground truth comments 316 aligned with the binary code (e.g., code-comment alignment 322) to the elements described above relative to FIGS. 3A and 3B.

Figure 3D:
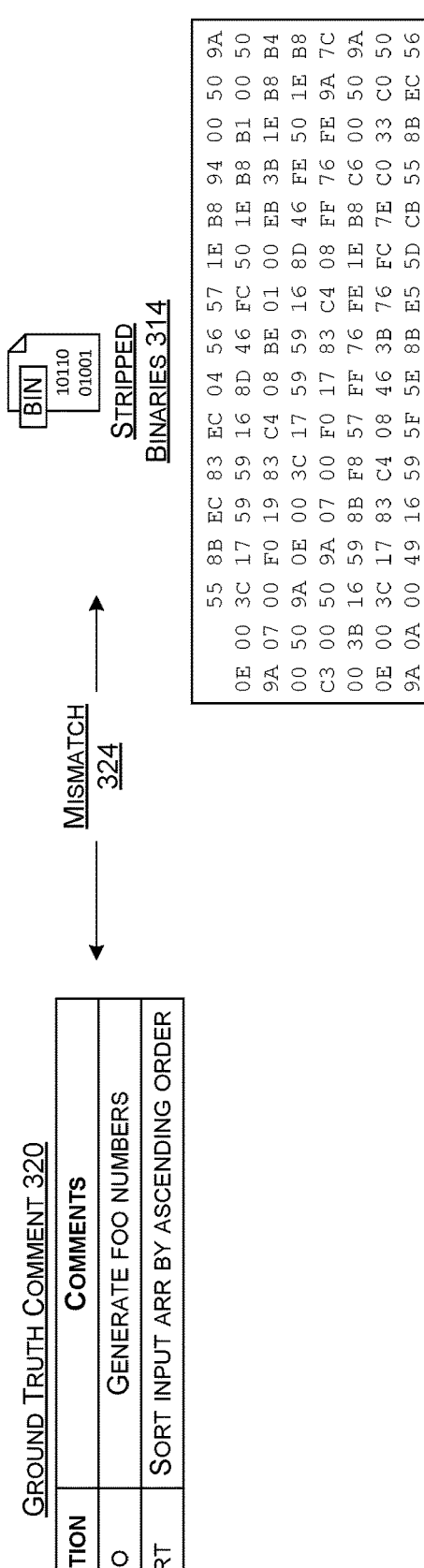

FIGS. 3D and 3E collectively show code comment alignment. Specifically, FIG. 3D shows potential mismatches at 324 between the ground truth comments 320 and the stripped binaries 314. Recall that source code comments are removed during preprocessing compilation. Thus, there is no indication of which function is associated with which ground truth comment. Code comment alignment (e.g., re-alignment) re-establishes this relationship between functions and ground truth comments.

FIG. 3E shows an example of how the code comment alignment is achieved. Binaries with debugging information 306 serve as the bridge. Dwarf entry 326 contains the start and end address of each binary function. Source function names, comments, and binary function addresses are mapped. The mapped relationships are further used to identify the start and end machine code in the stripped binaries.

To extract the assembly code representations of binary functions, start and end addresses of the functions are identified by parsing the Dwarf entries to get the DW_AT_low_pc and DW_AT_high_pc attributes. With the addresses, binary functions are disassembled with capstone.Cs.disasm_-lite API. The function addresses are also used for raw bytes extraction from binaries, where the bytes are read directly based on addresses.

Figure 3F:
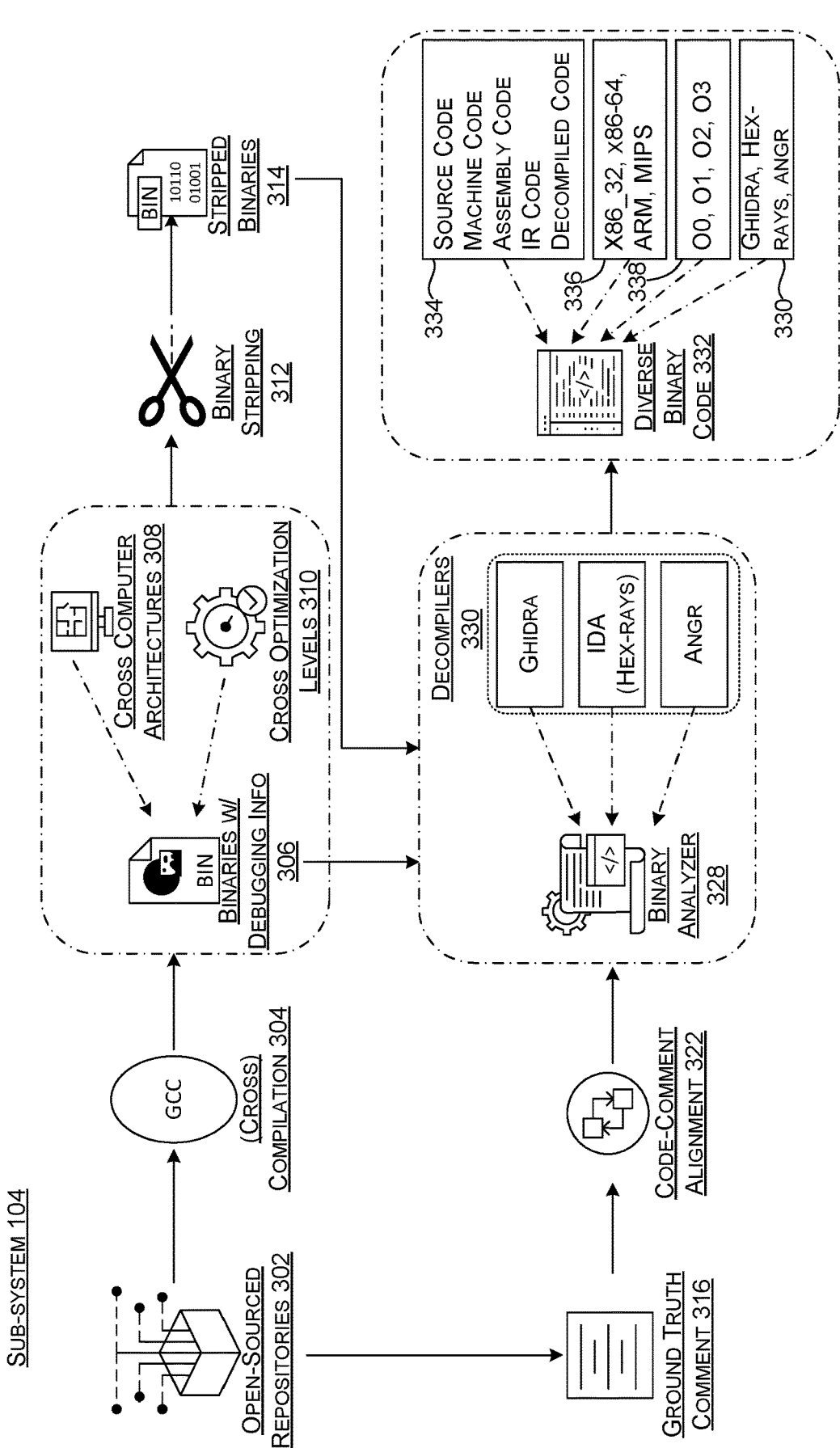

FIG. 3F shows the final operations. After obtaining the binaries (e.g., binaries with debugging info 306 and stripped binaries 314) and ground truth comments (316), binary analysis is performed on the binaries with and without debugging info by the binary analyzer 328. This process can use various decompilers 330, such as Ghidra, Angr, and/or IDA, among others.

This analysis results in the datasets with diverse binary code 332 from different code sources 334, in different architectures 336, and optimization levels 338 with different decompilers 330. With the diverse binary code 332 compiled from various compilation settings, the present implementations decompile binaries with decompilers 330, such as Ghidra and Hex-Rays, which are the most popular decompilers among reverse engineers and academic researchers. For example, NFRE models the function semantics for stripped binary functions with the assembly code generated by IDA. varBERT predicts variable names by learning local variable semantics with Ghidra output. Therefore, this implementation tests whether LLMs can understand binary code semantics by decompiling binaries with these two decompilers. For Ghidra and Hex-Rays, their respective Python APIs ghidra.app.decompiler. DecompInterface and idaapi.decompile are employed to iteratively decompile functions in the .text segment, respectively.

Figure 4:
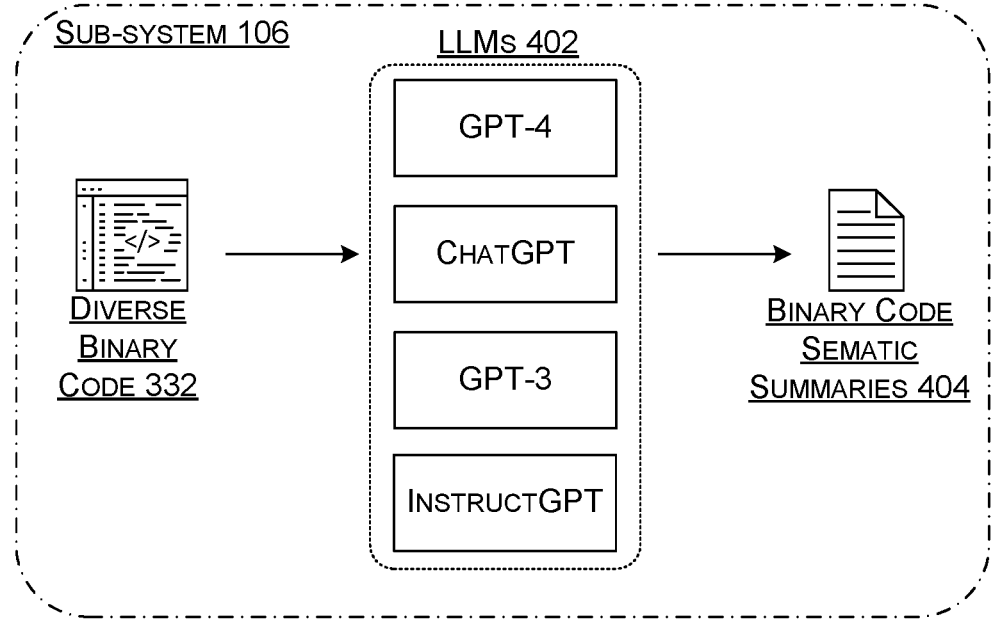

FIG. 4 shows an example sub-system 106 and example operations that can be performed by the sub-system. Sub-system 106 relates to employing large language models 402 to interpret the diverse binary code 332. The sub-system 106 generates binary code semantic summarizations (e.g., semantic summaries) 404 of the diverse binary code 332. In some cases, the sub-system 106 can also create an index that includes, the ground truth labels, the semantic summarizations and/or binary code (e.g., embeddings). The index can facilitate search and discoverability of the content for subsequent processes, such as for comparison/evaluation for subsequent binary codes samples and/or respective semantic summarizations.

In this configuration, the binary code summarization task is performed on the diverse binary code dataset with four LLM models 402, including, ChatGPT, GPT-3, GPT-4, and InstructGPT, among others. The same hyperparameters are used in each case. The hyperparameters include a low temperature to stable summarization results. This implementation involves over 1 million queries to the LLM models. Multi-threading can be employed to accelerate the processing rate.

FIG. 5 shows three evaluation metrics, including BLEU score 502, METEOR score 504, and rouge score 506 that were employed for semantic summary evaluation. A key takeaway of these three metrics are their values are from 0 to 1. The higher the values are, the better the binary code semantic summaries are. Exact word matching between LLM summarization and ground truth provides a high value. However, natural language is very noisy. The expressions in the same semantics can be expressed in very different words. Thus, different words and phrases that have similar semantics should also produce a relatively high score.

Figure 6:
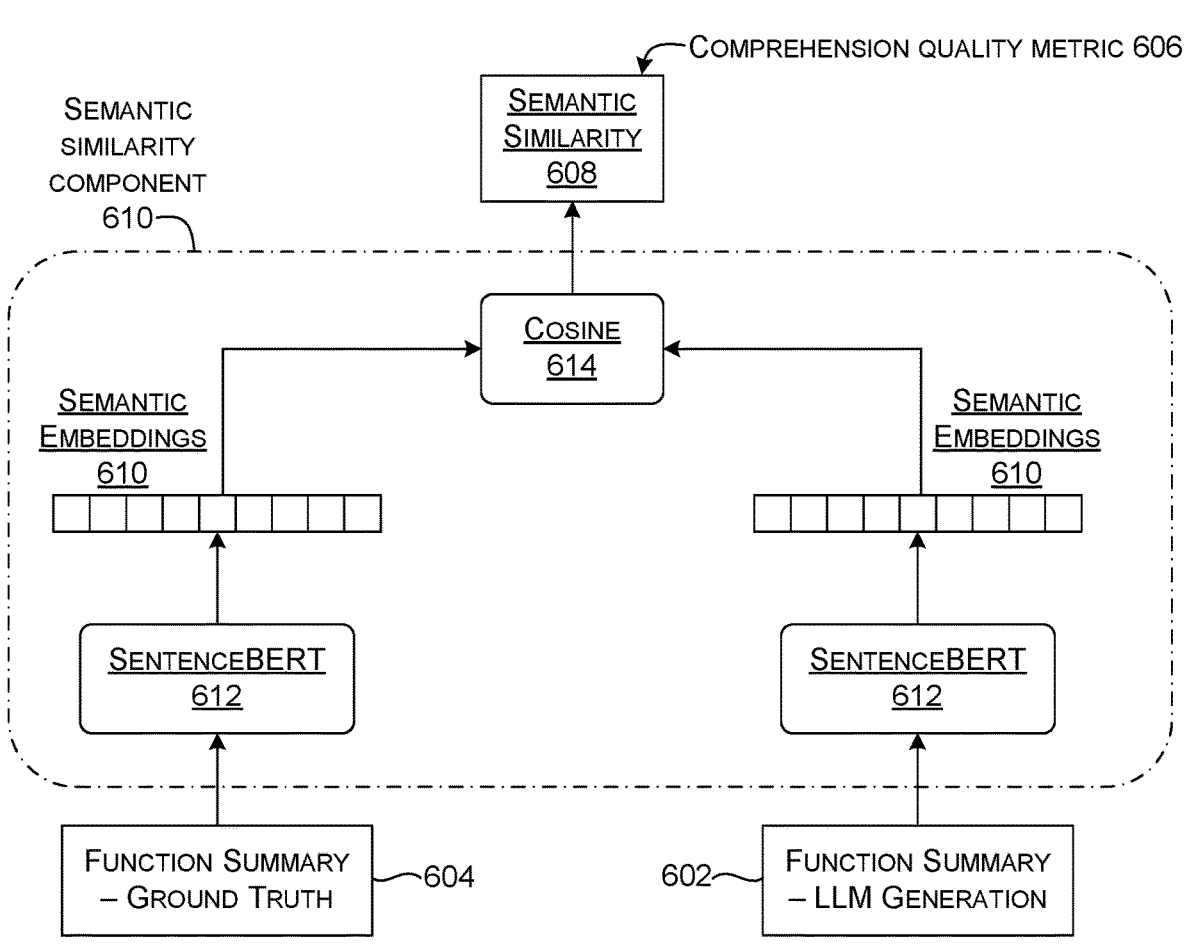

FIG. 6 shows an example sub-system 108 and example operations that can be performed by the sub-system. Sub-system 108 relates to assessing the generated semantic summaries (e.g., function summary—LLM generated 602) and comparing them to the ground truth (e.g., function summary—ground truth 604). This comparison enables establishment of a comprehension quality measurement 606 in the form of a semantic similarity 608. The comprehension quality measurement provides a benchmark for evaluating understanding of the binary code.

Note that exact word matching between the LLM summarization and the ground truth should provide a high score. Note also that natural language is very noisy. The expressions in the same semantics can be expressed in very different words but should also return high scores. Various comparison metrics can be employed. Three example comparison metrics include BLEU score, METEOR score and rouge score are shown and discussed relative to FIG. 5. These comparison metrics provided high scores when the expressions were very similar (e.g., included the same words in the same order). However, these comparison metrics did not provide high scores when the expressions were different but the meaning was the same (e.g., they didn't correlate the same concept being expressed with different words and/or order of words). Thus, these scenarios create a technical problem relating to recognizing semantic equivalencies between the LLM summarizations and ground truths.

The present concepts provide a technical solution for semantically matching LLM generated summaries. The technical solution includes a semantic similarity component 610. In some of the present implementations the semantic similarity component includes a sentenceBERT model 612 to generate semantic embeddings of both the ground truth 604 and the LLM generated semantic summaries 602. Then the semantic embeddings are matched by a cosine function 614 which will finally output semantic similarity score 608. The value range of this similarity 608 is from −1 to 1. The higher the semantic similarity 608, the better the LLM generated semantic summaries 602. Stated another way, the scoring reflects similarity between the comprehension quality metric and the semantic summarization.

For the sentenceBERT model 612, a list of evaluations was performed to determine its base model. Similar to the prior three evaluation metrics, the higher the similarity score is, the better the LLM generated semantic summaries are. For purposes of evaluations the ground truth is compared to the LLM generated binary code semantic summaries.

Figure 7:
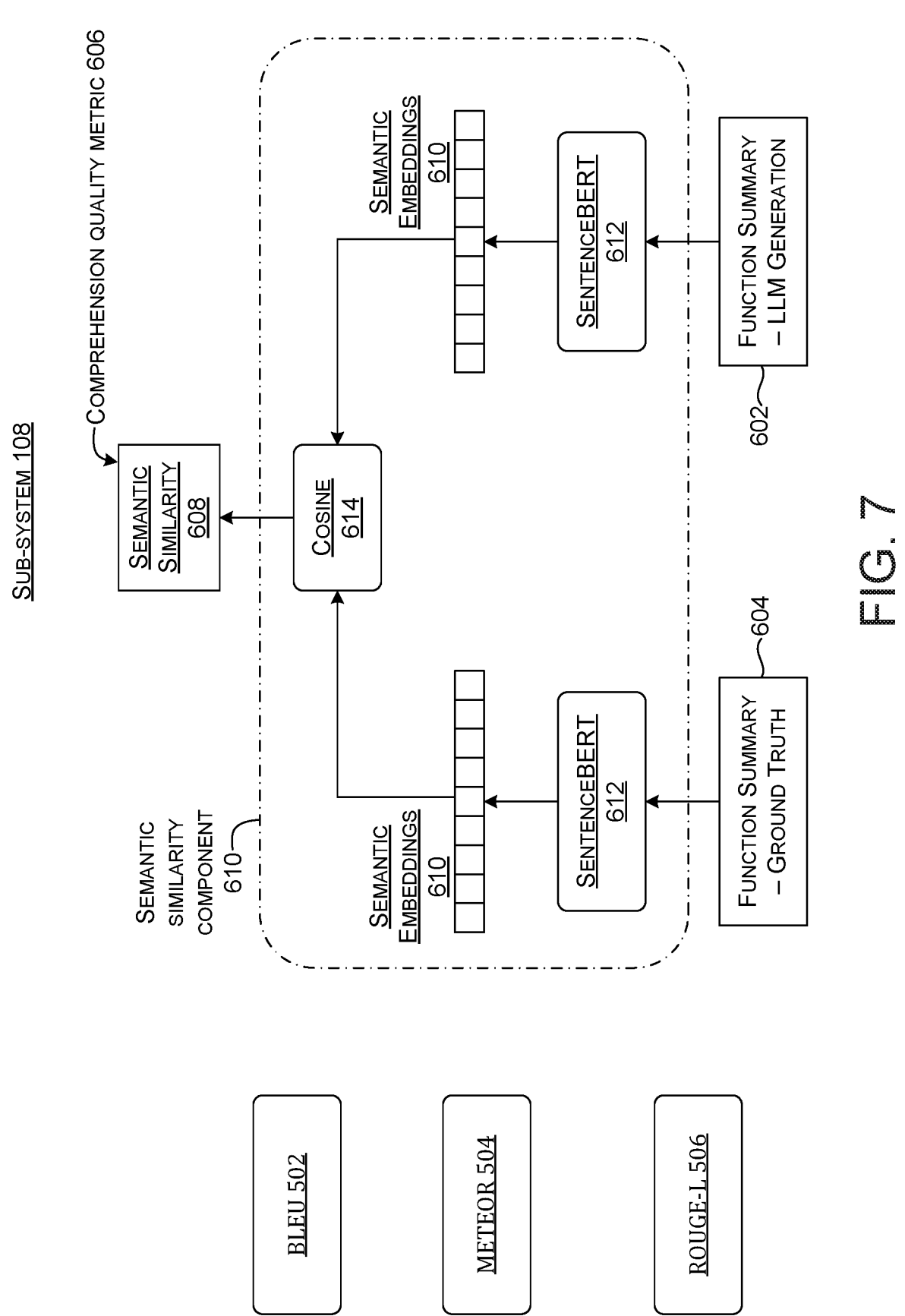

FIG. 7 shows the BLEU score 502, METEOR score 504, and rouge score 506 components of FIG. 5 and the semantic similarity component 610 of FIG. 6. The description now turns to results provided for these evaluators. Example results are described relative to FIGS. 8-10.

Figure 8:
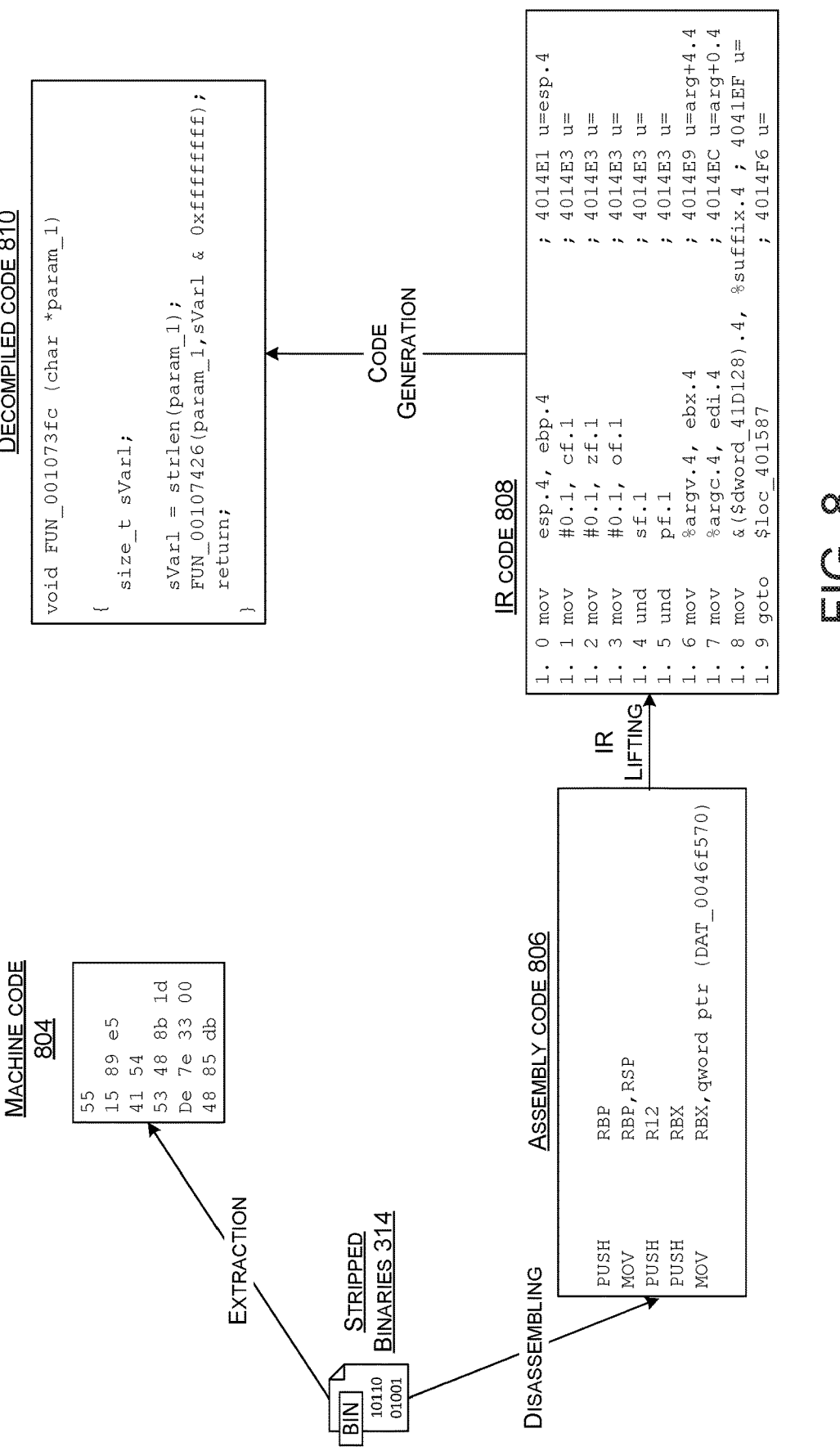
Figure 9:
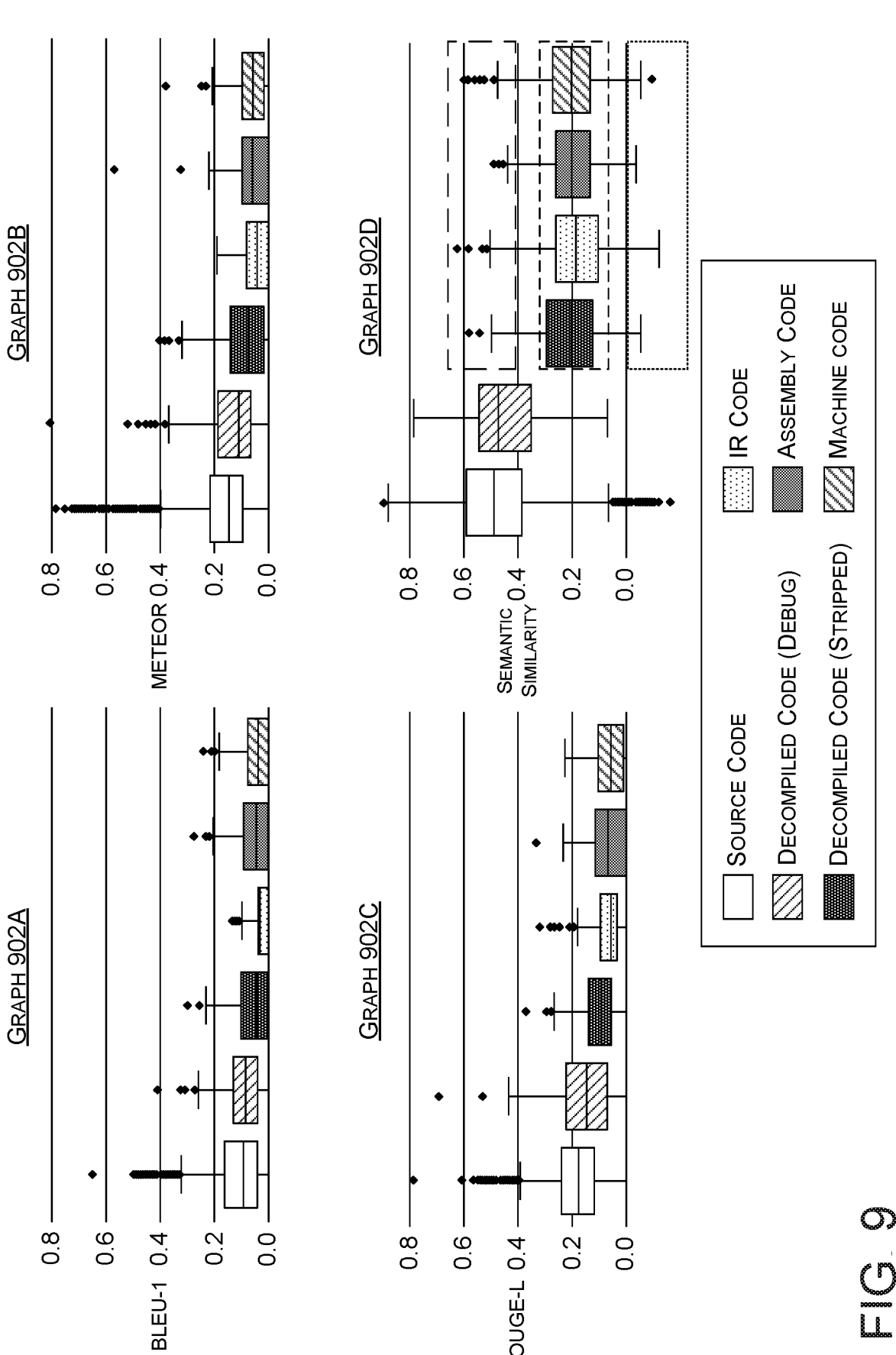
FIGS. 9 and 16 show example binary code semantic summarization graphs that are consistent with some implementations of the present concepts.

FIGS. 8-9 show example results of LLMs' ability to comprehend binary code semantics. Further, the examples show which binary code representations are most effective in enhancing LLMs' comprehension.

FIG. 8 shows binary code represented in different formats starting with stripped binaries 314. Extraction of the stripped binaries 314 can produce machine code 804. Disassembly of the stripped binaries 314 produces assembly code 806. IR lifting of the assembly code 806 produces intermediate representation (IR) code 808. Code generation of the IR code 808 produces decompiled code 810.

FIG. 9 shows the performance of LLMs regarding the four evaluation metrics provided by BLEU score 502, METEOR score 504, and rouge score 506, and the semantic similarity component 610 as graphs 902A, 902B, 902C, and 902D, respectively. On the graphs 902, the x-axis shows the source code, decompiled code from binaries with debugging info, decompiled code from stripped binary, IR code, assembly code, and machine code, respectively. The y-axis includes the respective BLEU scores, METEOR scores, ROUGE-L scores, and the semantic similarity scores, on graphs 902A-902D, respectively.

The four graphs 902 show a clear performance gap between source code and decompiled code. Moreover, the loss of debugging info during the binary stripping process tends to result in a huge performance degradation. Among the different binary code representations, the decompiled code tends to be the best binary code representation for this task.

FIGS. 10-12 show examples of assembly code samples. FIG. 10 shows sample 1 with the highest scores. FIG. 11 shows sample 3 with the median scores. FIG. 12 shows sample 5 with the lowest scores.

FIG. 10 shows table 1002 that shows the ground truth comments and the LLM generated semantic summaries of the assembly code samples that achieve the best evaluation scores. This FIG. shows the assembly function code for the first sample. As shown LLMs can correctly infer the semantics of this binary function, which basically count the number of "&" symbols. In the table, the highlighted words/phrases have the same semantics. Similarly, LLMs can understand the semantics of the second binary sample as skipping the whitespace of the input string.

FIG. 11 shows table 1102 that shows the ground truth comments and LLM generated semantic summaries of the assembly code samples that achieve the median evaluation scores. However, for the assembly code samples with median scores, the LLMs seem to fail to capture the assembly code semantics. However, in this case the input code is extremely long. Truncating the code involved skipping many lines. It's reasonable that the LLMs cannot understand a very long binary code function in assembly code.

FIG. 12 shows table 1202 that shows the ground truth comments and LLM generated semantic summaries of the assembly code samples that achieve the lowest evaluation scores. For the assembly samples with the lowest scores, LLMs also failed to understand the semantics. However, the ground truth comments often contain some domain specific terminologies, such as COFF debug and sec_info_type. It appears these terms are even harder for human reverse engineers to appreciate than for LLMs.

FIGS. 13-15 show examples of decompiled code (stripped) samples. FIG. 13 shows table 1302 that shows the ground truth comments and LLM generated semantic summaries of the decompiled code (stripped) samples that achieve the best evaluation scores. The decompiled code from stripped binaries shows the similarly excellent performance of LLMs on the samples with the highest scores, where LLMs can understand binary code semantic well.

FIG. 14 shows table 1402 that shows the ground truth comments and LLM generated semantic summaries of the decompiled code (stripped) samples that achieve the median evaluation scores. For samples with median scores the LLMs can capture partial function semantics. For example, LLMs correctly infer the semantics of the object copy operation in sample 3.

FIG. 15 shows table 1502 that shows the ground truth comments and LLM generated semantic summaries of the decompiled code (stripped) samples that achieve the lowest evaluation scores. For samples with the lowest scores, the ground truth comments also contain some domain specific terms.

In relation to the IR code, the LLMs generate similar semantic summaries for different IR code samples. For example, the semantic summaries tend to describe the process of initialization and arithmetic operations. This means LLMs have more difficulty understanding IR code. IR code is much longer than assembly code and decompiled code, which could be the reason for the relatively poor performance.

Figure 16:
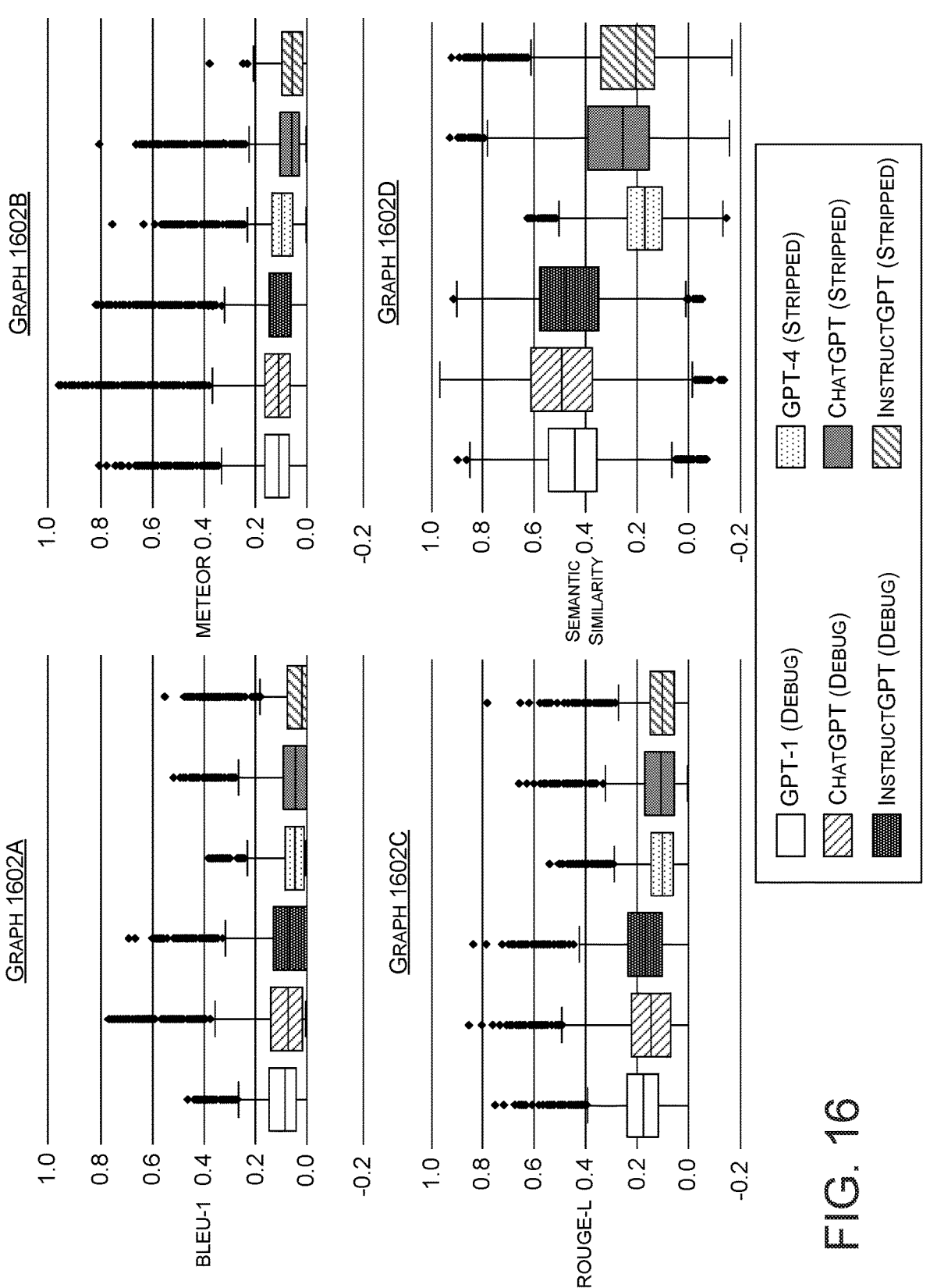

FIG. 16 shows graphs 1602A-1602D that show an evaluation of which of the example LLMs is the best one for the binary comprehension task. The first three bars of each graph show the performance of GPT-4, chatgpt, and InstructGPT on decompiled code with debugging info, the next three bars show the performance of these models on decompiled code from stripped binaries. As usual, the LLMs perform better on the binaries with debugging info compared to stripped binaries. ChatGPT is better than GPT-4 and InstructGPT, which is out of expectation.

The description now turns to how the diverse binary code can affect LLMs in the binary code comprehension task. Recall that different computer architectures and optimization levels can result in different binary code. Evaluations on computer architectures show that of x86-64, x86-32, arm and mips architectures, LLMs tend to perform the best on the x86-32 binary code. Optimization level evaluations compared the performance of O0 to O3 optimizations. LLMs tend to be better at understanding the higher optimizations.

The output of decompilers affects LLM performance. Recall that different decompilers generate different decompiled code. Evaluations were performed on the LLMs' performance of Ghidra, IDA, and Angr decompiled code from binaries with debugging info and on stripped binaries. The IDA decompiler offers better and more consistent performance than the others. A key observation is that Angr is not an ideal decompiler as it's much slower than others. For example, in one scenario it took about 8 hours to decompile one thousand real-world binaries but angr took over one week and it only finished half of the binaries.

Recall that decompiled code from stripped binaries may miss some key semantic information, including data type, variable names, and/or function names. An ablation study was conducted to determine which semantic information contributes most to binary code semantics. The process started with the decompiled code from binaries with debugging info. The function names, variable names, and data type information were selectively stripped from the binaries.

The evaluation was conducted on the performance of decompiled code with all semantic information, function name stripped, variable name stripped, type information stripped, and all stripped. The results indicate that the function and variable names contribute significantly to the binary code semantics while type information is less important.

The explanation above includes a description of a novel large-scale binary code comprehension dataset with diverse binary code and various compilation settings. The explanation also includes a novel automated binary code summarization framework (e.g., BinGPT) with novel components of prompt synthesis, optimization, and evaluation metrics. The description also includes extensive and comprehensive studies with profound insights and exhibits the capacities of the most powerful LLMs on the binary code understanding task.

Figure 17A:
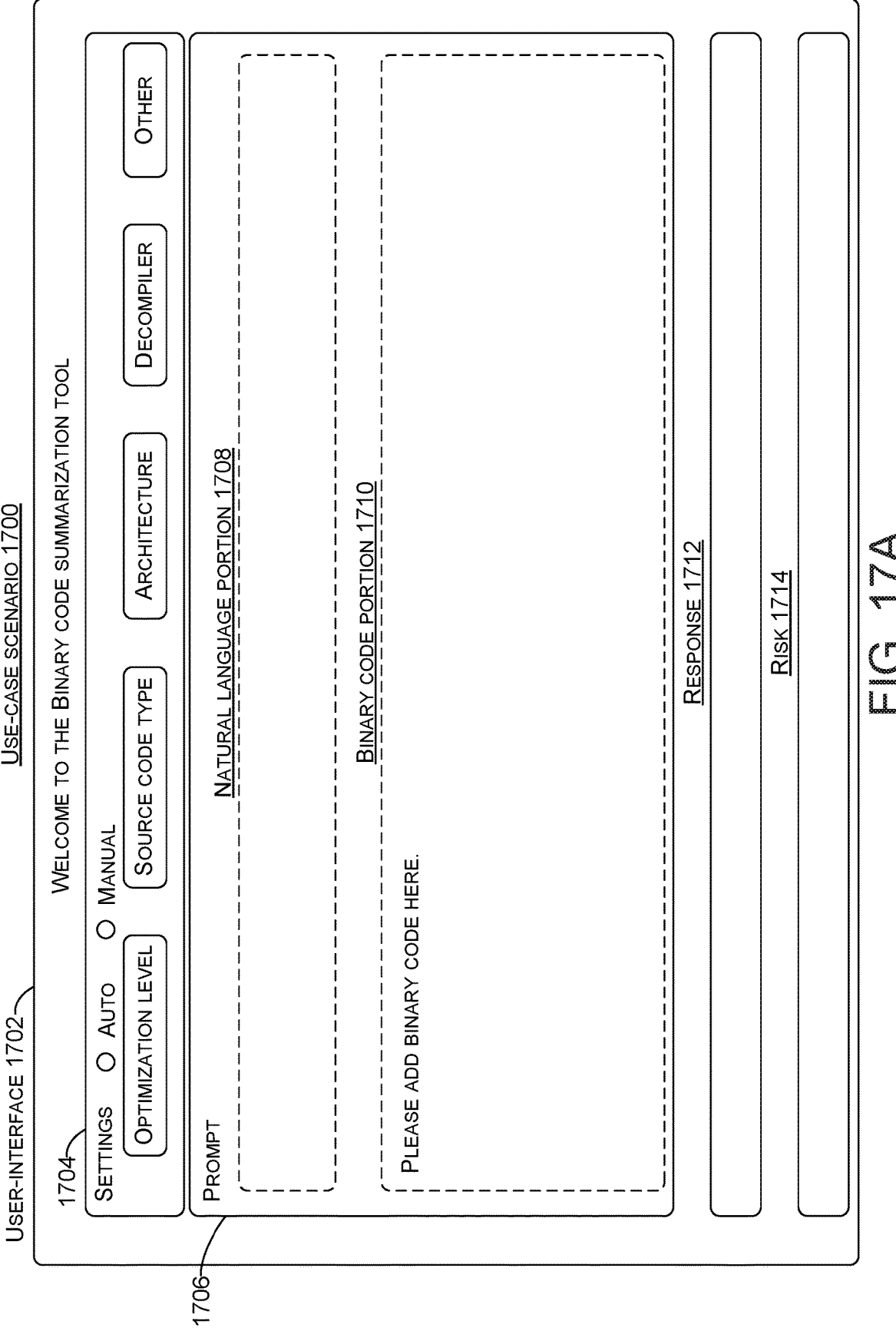
FIGS. 17A-17C illustrate example binary code semantic summarization user interfaces that are consistent with some implementations of the present concepts.
Figure 17B:
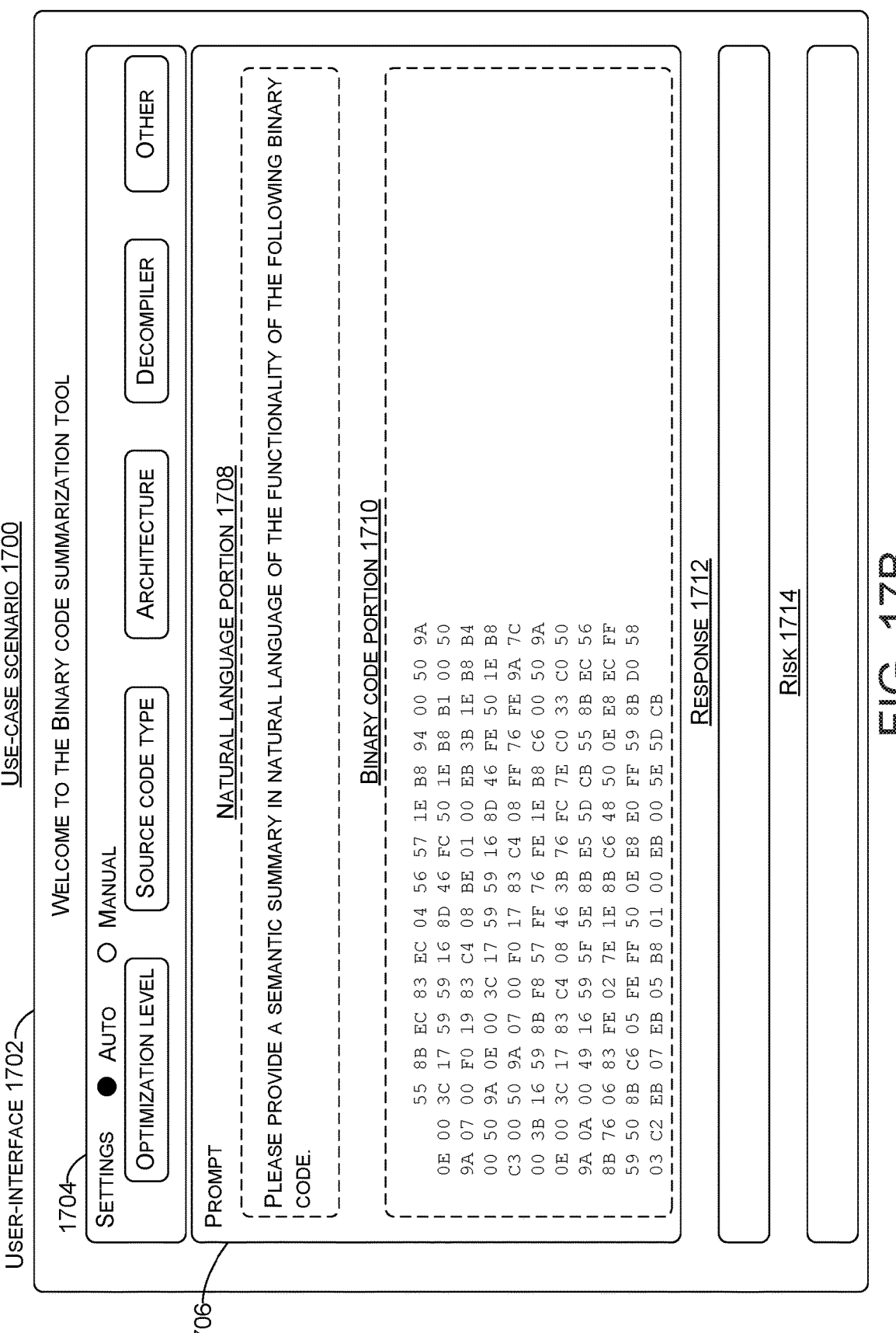
Figure 17C:
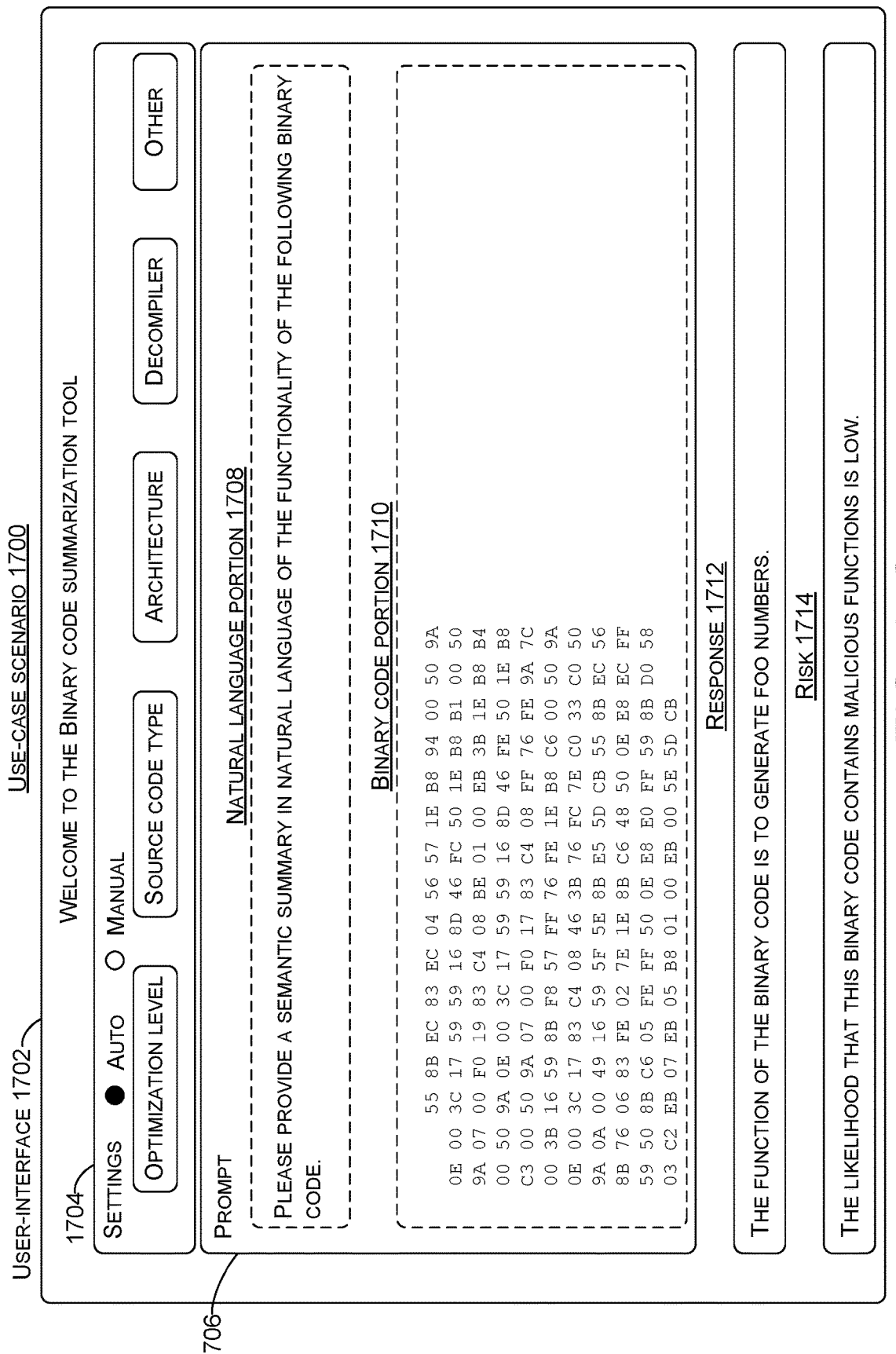

FIGS. 17A-17C collectively show an example use case scenario 1700 involving the present concepts. The use case scenario involves a user-interface (UI) 1702. As shown in FIG. 17A, the UI 1702 includes a settings section 1704 and a prompt section 1706. In the settings section 1704 the user can select "auto" or "manual." "Auto" allows the binary code summarization tool to select various parameters. "Manual" allows the user to set various parameters, such as optimization level, source code type, hardware architecture, decompiler, and/or others.

The prompt section 1706 includes two portions. The first portion is the natural language portion 1708 This portion is automatically populated by the binary code summarization tool based upon highly performing prompts. This aspect is described above relative to FIG. 2.

The second portion is the binary code portion 1710. The binary code portion receives the binary code from the user. For instance, the user may paste the binary code into the portion. Alternatively, the user may provide a file location for the binary code, among other techniques. The UI also includes a response section 1712 and a risk section 1714, which will be discussed below relative to FIG. 17C.

FIG. 17B shows the UI 1702 where the user has selected "auto" in the settings section 1704. The user has also added binary code to the binary code portion 1710. The binary code summarization tool has populated natural language into the natural language portion 1708. The binary code summarization tool can provide the prompt 1706 to the LLM. The response received from the LLM is described below relative to FIG. 17C.

FIG. 17C shows a subsequent instance of the UI 1702 where the response 1712 is populated with content from the LLM. In this case, the content states that "The function of the binary code is to generate foo numbers." The binary code summarization tool has analyzed the content from the LLM and identified in the risk section 1714 that "The likelihood that the binary code contains malicious functions is low." Thus, the user is provided with the function of the binary code and risk associated with the binary code. This allows the user to make an informed decision whether to approve or otherwise use the binary code.

Several implementations are described in detail above. FIG. 18 shows a flowchart of an additional example method 1800 that is consistent with the description above and below. At block 1802, the method can select a prompt for an interpretation task relating to binary code. Example prompt selection methods are described above relative to FIG. 2.

At block 1804, the method can construct a binary code dataset that includes a ground truth. The binary code dataset can include binary code samples and corresponding source code samples that include information about functions performed by the source code. This information can contribute to the ground truth.

At block 1806, the method can employ a large language model (LLM) to interpret the binary code and generate a semantic summarization and index of the binary code. The index can include the semantic summarizations and/or the binary code. The index enhances the usefulness of this content by enabling discoverability and/or search related to subsequent processes.

At block 1808, the method can compare the generated semantic summarization and the ground truth to establish a comprehension quality metric and enable discovery and search of the index. The comprehension quality metric reflects semantic similarity between the ground truths and the semantic summarizations of the binary code dataset.

At block 1810, the method can receive the semantic summarization from the LLM relating to the binary code.

At block 1812, the method can score the semantic summarization utilizing the comprehension quality metric. Stated another way, the comprehension quality metric provides or allows an objective evaluation the semantic summarization.

At block 1814, the method can identify a risk that the binary code includes malicious instructions based upon the scoring.

At block 1816, the method can receive new binary code. Blocks 1816-1820 apply the techniques and information from blocks 1802-1814 to new source code to provide meaningful information and analysis about the function(s) of the new source code.

At block 1818, the method can populate a selected relatively high-ranking optimized prompt for the LLM with the new binary code. The complete prompt with the new source code and natural language can be supplied (e.g., sent) to the LLM.

At block 1820, the method can receive a new semantic summarization from the LLM relating to the new binary code.

At block 1822, the method can present the new semantic summarization from the LLM relating to the new binary code.

At block 1824, the method can examine the new semantic summarization for malicious functionality in the new binary code.

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Figure 19:
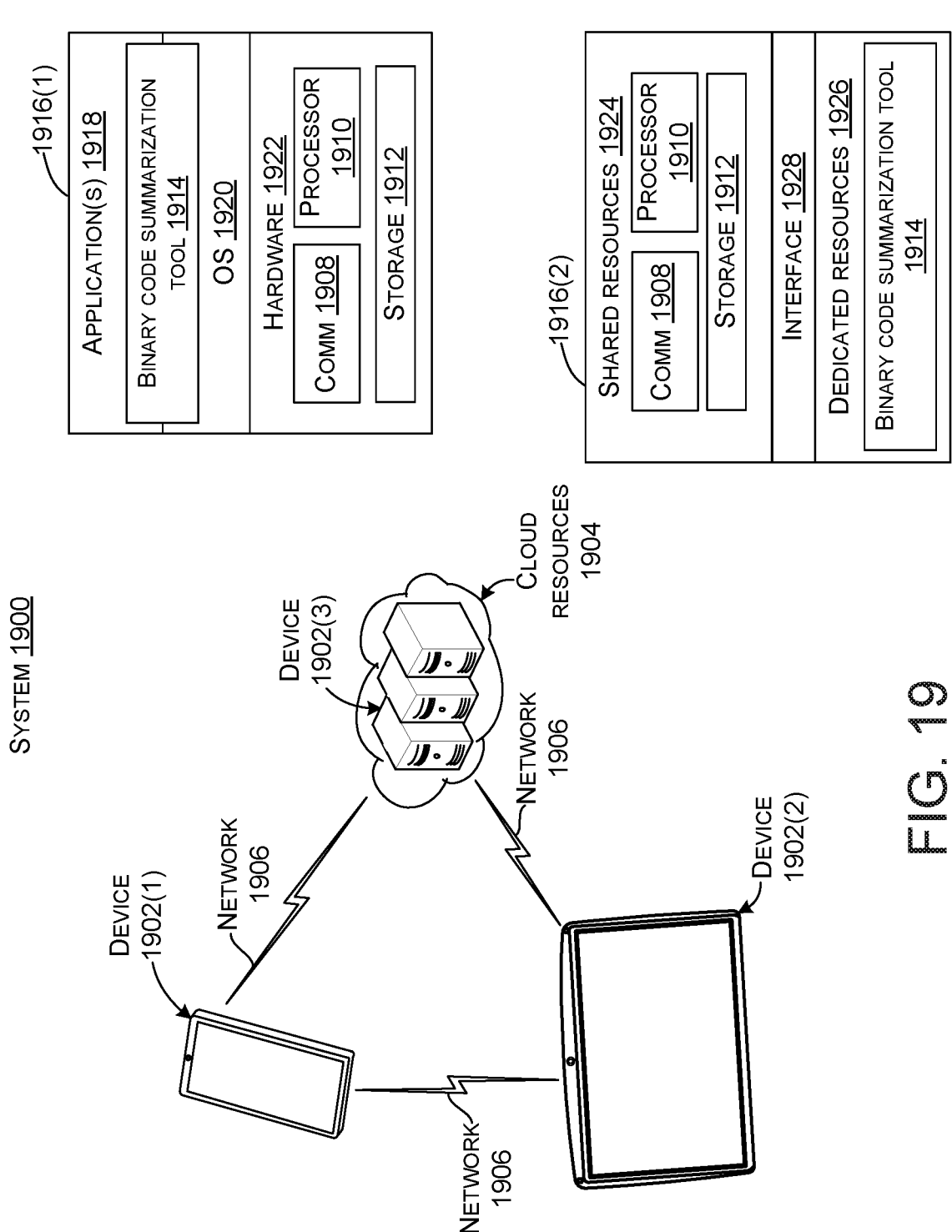

FIG. 19 shows an example system 1900. System 1900 can include computing devices 1902. In the illustrated configuration, computing device 1902(1) is manifest as a smartphone, computing device 1902(2) is manifest as a tablet type device, and computing device 1902(3) is manifest as a server type computing device, such as may be found in a datacenter as a cloud resource 1904. Computing devices 1902 can be coupled via one or more networks 1906 that are represented by lightning bolts.

Computing devices 1902 can include a communication component 1908, a processor 1910, storage resources (e.g., storage) 1912, and/or a binary code summarization tool 1914.

The binary code summarization tool 1914 can be configured to receive binary code and to combine the received binary code with natural language in a prompt for an LLM. The binary code summarization tool 1914 can be configured to receive a semantic summarization from the LLM relating to the received binary code. The binary code summarization tool 1914 can be configured to evaluate the new semantic summarization for malicious functionality in the received stripped binary code. In some cases, the binary code summarization tool 1914 can be configured to generate a UI, such as the UI described relative to FIGS. 17A-17C, to receive and present data and information.

FIG. 19 shows two device configurations 1916 that can be employed by computing devices 1902. Individual computing devices 1902 can employ either configuration 1916(1) or 1916(2), or an alternate configuration. (Due to space constraints on the drawing page, one instance of each configuration is illustrated). Briefly, device configuration 1916(1) represents an operating system (OS) centric configuration. Device configuration 1916(2) represents a system on a chip (SOC) configuration. Device configuration 1916(1) is organized into one or more applications 1918, operating system 1920, and hardware 1922. Device configuration 1916(2) is organized into shared resources 1924, dedicated resources 1926, and an interface 1928 therebetween.

In configuration 1916(1), the binary code summarization tool 1914 can be manifest as part of the operating system 1920. Alternatively, the binary code summarization tool 1914 can be manifest as part of the applications 1918 that operates in conjunction with the operating system 1920 and/or processor 1910. In configuration 1916(2), the binary code summarization tool 1914 can be manifest as part of the processor 1910 or a dedicated resource 1926 that operates cooperatively with the processor 1910.

In some configurations, each of computing devices 1902 can have an instance of the binary code summarization tool 1914. However, the functionalities that can be performed by the binary code summarization tool 1914 may be the same or they may be different from one another when comparing computing devices. For instance, in some cases, each binary code summarization tool 1914 can be robust and provide all of the functionality described above and below (e.g., a device-centric implementation).

In other cases, some devices can employ a less robust instance of the binary code summarization tool 1914 that relies on some functionality to be performed by a binary code summarization tool 1914 on another device.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on/in storage, such as storage that can be internal or external to the device and is configured to store the data. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 1916(2) can be thought of as a system on a chip (SOC) type design. In such a case, functionality provided by the device can be integrated on a single SOC or multiple coupled SOCs. One or more processors 1910 can be configured to coordinate with shared resources 1924, such as storage 1912, etc., and/or one or more dedicated resources 1926, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, hardware processing units, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU, CPUs, GPU or GPUs). The program code can be stored in one or more computer-readable memory devices, such as computer-readable storage media. The features and techniques of the components are platform-independent, meaning that they may be implemented on a variety of commercial computing platforms having a variety of processing configurations.

ADDITIONAL EXAMPLES

Various examples are described above. Additional examples are described below. One example includes a device-implemented method comprising selecting a prompt for an interpretation task relating to binary code, constructing a binary code dataset that includes a ground truth, employing a large language model (LLM) to interpret the binary code and generating a semantic summarization and index of the binary code, and comparing the generated semantic summarization and the ground truth to establish a comprehension quality metric and enabling discovery and search of the index.

Another example can include any of the above and/or below examples where the selecting comprises synthesizing prompts and ranking the prompts.

Another example can include any of the above and/or below examples where the ranking the prompts comprises optimizing the synthesized prompts and selecting relatively high-ranking optimized prompts.

Another example can include any of the above and/or below examples where the method further comprises receiving the semantic summarization from the LLM relating to the binary code, scoring the semantic summarization utilizing the comprehension quality metric, and identifying a risk that the binary code includes malicious instructions based upon the scoring.

Another example can include any of the above and/or below examples where the scoring reflects a similarity between the comprehension quality metric and the semantic summarization.

Another example can include any of the above and/or below examples where the method further comprises receiving new unknown binary code and populating a selected relatively high-ranking optimized prompt for the LLM with the new unknown binary code.

Another example can include any of the above and/or below examples where the method further comprises supplying the populated selected relatively high-ranking optimized prompt to the LLM and receiving a new semantic summarization from the LLM relating to the new unknown binary code.

Another example can include any of the above and/or below examples where the method further comprises examining the new semantic summarization for malicious functionality in the new unknown binary code.

Another example includes a system comprising hardware and a binary code summarization tool configured to receive binary code and to combine the received binary code with natural language in a prompt for a large language model (LLM) and to receive a semantic summarization from the LLM relating to the received binary code and to evaluate the semantic summarization for malicious functionality in the received binary code.

Another example can include any of the above and/or below examples where the binary code summarization tool is configured to cause a user interface to be generated that is configured to receive the binary code.

Another example can include any of the above and/or below examples where the binary code summarization tool is configured to cause the semantic summarization to be presented on the user interface.

Another example can include any of the above and/or below examples where the binary code summarization tool is configured to examine the semantic summarization for malicious functionality.

Another example includes a system comprising storage configured to store computer-readable instructions and a processor configured to execute the computer-readable instructions to synthesize and rank a set of prompts for a binary code interpretation task, construct a dataset that includes binary code samples and corresponding source code ground truths, employ a large language model (LLM) to interpret the binary code samples utilizing a high-ranking prompt from the set of prompts and generate semantic summarizations for the binary code samples, compare the generated semantic summarizations and the ground truths to establish a comprehension quality metric, and evaluate an individual semantic summarization of an individual binary code sample using the comprehension quality metric.

Another example can include any of the above and/or below examples where the employing a large language model (LLM) to interpret the binary code samples utilizing a high-ranking prompt is repeated for multiple high-ranking prompts and for multiple LLMs.

Another example can include any of the above and/or below examples where the comprehension quality metric is calculated for each of the prompts.

Another example can include any of the above and/or below examples where the comprehension quality metric is calculated from similarities between the semantic summarizations of the binary code samples and ground truth functional statements in corresponding source code.

Another example can include any of the above and/or below examples where the comprehension quality metric conveys a semantic similarity between the semantic summarizations for each of the prompts.

Another example can include any of the above and/or below examples where the individual binary code is subsequently received binary code and the processor is further configured to cause a user interface to be generated to receive the subsequent binary code.

Another example can include any of the above and/or below examples where the processor is further configured to populate the high-ranking prompt with the subsequent binary code.

Another example can include any of the above and/or below examples where the subsequent binary code comprises stripped binary code.

CONCLUSION

The description includes binary code summarization concepts. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A device-implemented method comprising:
    synthesizing multiple prompts for an interpretation task relating to first binary code provided in one or more first executable files;
    constructing a binary code dataset that includes ground truth explanations of the first binary code;
    employing a large language model (LLM) to interpret the first binary code and generate first semantic summarizations of the first binary code for each of the multiple prompts;
    comparing the first semantic summarizations and the ground truth explanations, the comparing resulting in comprehension quality metrics for each of the multiple prompts;
    ranking the multiple prompts according to the comprehension quality metrics;
    choosing a selected prompt based at least on the ranking;
    receiving second binary code provided in one or more second executable files;
    inputting the second binary code to the LLM with the selected prompt;
    receiving a second semantic summarization of the second binary code from the LLM, the second semantic summarization being generated by the LLM by evaluating the second binary code according to the selected prompt, wherein the selected prompt adapts the LLM via in-context learning to capture semantics of the second binary code; and providing risk associated with the second binary code according to the captured semantics of the second binary code.

2. The device-implemented method of claim 1, wherein the second binary code is stripped binary code having at least some debugging information removed.

3. The device-implemented method of claim 2, wherein the ranking comprises optimizing the multiple prompts.

4. The device-implemented method of claim 3, wherein the risk conveys a likelihood that the second binary code includes malicious instructions.

5. The device-implemented method of claim 1, wherein the LLM is a transformer-based generative language model.

6. The device-implemented method of claim 1, wherein the ground truth explanations include developer comments in first source code corresponding to the first binary code.

7. The device-implemented method of claim 6, further comprising performing alignment of the developer comments to the first binary code.

8. The device-implemented method of claim 7, wherein the performing alignment includes mapping individual developer comments in the first source code to corresponding binary function addresses in the first binary code.

9. A system, comprising:

storage hardware configured to store computer-readable instructions; and, a processor configured to execute the computer-readable instructions, wherein, when executed, the computer-readable instructions cause the processor to:

synthesize multiple prompts for an interpretation task relating to first binary code provided in one or more first executable files;

construct a binary code dataset that includes ground truth explanations of the first binary code;

employ a large language model (LLM) to interpret the first binary code and generate first semantic summarizations of the first binary code for each of the multiple prompts;

compare the first semantic summarizations and the ground truth explanations, the comparing resulting in comprehension quality metrics for each of the multiple prompts;

rank the multiple prompts according to the comprehension quality metrics;

choose a selected prompt based at least on the ranking;

receive second binary code provided in one or more second executable files;

input the second binary code to the LLM with the selected prompt;

receive a second semantic summarization of the second binary code from the LLM, the second semantic summarization being generated by the LLM by evaluating the second binary code according to the selected prompt, wherein the selected prompt adapts the LLM via in-context learning to capture semantics of the second binary code; and provide risk associated with the second binary code according to the captured semantics of the second binary code.

10. The system of claim 9, wherein the second binary code is stripped binary code having at least some debugging information removed.

11. The system of claim 9, wherein the risk conveys a likelihood that the second binary code includes malicious instructions.

12. The system of claim 9, wherein the LLM is a transformer-based generative language model.

13. The system of claim 9, wherein the ground truth explanations include developer comments in first source code corresponding to the first binary code.

14. The system of claim 13, wherein the computer-readable instructions cause the processor to:

perform alignment of the developer comments to the first binary code.

15. The system of claim 14, wherein the computer-readable instructions cause the processor to:

perform the alignment by mapping individual developer comments in the first source code to corresponding binary function addresses in the first binary code.

16. A hardware computer-readable storage device storing computer-readable instructions which, when executed, by processing hardware, cause the processing hardware to perform acts comprising:

synthesizing multiple prompts for an interpretation task relating to first binary code provided in one or more first executable files;

constructing a binary code dataset that includes ground truth explanations of the first binary code;

employing a large language model (LLM) to interpret the first binary code and generate first semantic summarizations of the first binary code for each of the multiple prompts;

comparing the first semantic summarizations and the ground truth explanations, the comparing resulting in comprehension quality metrics for each of the multiple prompts;

ranking the multiple prompts according to the comprehension quality metrics;

choosing a selected prompt based at least on the ranking;

receiving second binary code provided in one or more second executable files;

inputting the second binary code to the LLM with the selected prompt;

receiving a second semantic summarization of the second binary code from the LLM, the second semantic summarization being generated by the LLM by evaluating the second binary code according to the selected prompt, wherein the selected prompt adapts the LLM via in-context learning to capture semantics of the second binary code; and providing risk associated with the second binary code according to the captured semantics of the second binary code.

17. The hardware computer-readable storage device of claim 16, wherein the risk conveys a likelihood that the second binary code includes malicious instructions.

18. The hardware computer-readable storage device of claim 16, wherein the ground truth explanations include developer comments in first source code corresponding to the first binary code.

19. The hardware computer-readable storage device of claim 18, the acts further comprising:

performing alignment of the developer comments to the first binary code.

20. The hardware computer-readable storage device of claim 19, the acts further comprising:

performing the alignment by mapping individual developer comments in the first source code to corresponding binary function addresses in the first binary code.

* * * * *